(12) United States Patent  (10) Patent No.: US 9,122,387 B1
Freeman et al.  (45) Date of Patent: Sep. 1, 2015

(54) USER CONFIGURED OPTIMIZER

(75) Inventors: Mary Ann Branch Freeman, Holliston, MA (US); Marcelo Marazzi, Cambridge, MA (US); Marjorie Berman, Newton, MA (US); Rakesh Kumar, Framingham, MA (US); Tara Scott, Millis, MA (US); Amy Kidd, Framingham, MA (US); Thomas Paul Lane, Carlisle, MA (US)

(73) Assignee: The MathWorks, Inc., Natick, MA (US)

( * ) Notice: Subject to any disclaimer, the term of this patent is extended or adjusted under 35 U.S.C. 154(b) by 350 days.

(21) Appl. No.: 13/290,694

(22) Filed: Nov. 7, 2011

Related U.S. Application Data

(63) Continuation-in-part of application No. 11/891,140, filed on Aug. 8, 2007, now Pat. No. 8,055,598, which is a continuation-in-part of application No. 11/652,262, filed on Jan. 10, 2007, now Pat. No. 7,664,720, and a continuation-in-part of application No. 10/198,510, filed on Jul. 17, 2002, now Pat. No. 7,231,631.

(51) Int. Cl.
*G06F 3/0484* (2013.01)
*G06N 99/00* (2010.01)

(52) U.S. Cl.
CPC .......... *G06F 3/04847* (2013.01); *G06N 99/005* (2013.01)

(58) Field of Classification Search
CPC ....................................... G06F 3/0484–3/0486
See application file for complete search history.

(56) References Cited

U.S. PATENT DOCUMENTS

| | | | |
|---|---|---|---|
| 5,860,008 A | 1/1999 | Bradley | |
| 6,112,181 A | 8/2000 | Shear et al. | |
| 6,138,119 A | 10/2000 | Hall et al. | |
| 6,216,138 B1 | 4/2001 | Wells et al. | |
| 6,427,142 B1 * | 7/2002 | Zachary et al. | 706/49 |
| 6,591,256 B1 * | 7/2003 | Friedman | 706/45 |
| 6,862,711 B1 | 3/2005 | Bahrs et al. | |
| 2003/0023121 A1 | 1/2003 | Frenzel et al. | |
| 2003/0163779 A1 | 8/2003 | Warren | |
| 2003/0164857 A1 | 9/2003 | Warren | |
| 2003/0204637 A1 | 10/2003 | Chong | |
| 2004/0064789 A1 | 4/2004 | Krausz et al. | |
| 2005/0066280 A1 | 3/2005 | Austin et al. | |

OTHER PUBLICATIONS

Miettinen, Kaisa et al.; Interactive multiobjective optimization system WWW-NIMBUS on the Internet; 2000; PERGAMON; Computers & Operations Research 27 (2000); pp. 709-723.*

(Continued)

*Primary Examiner* — Stanley K Hill
(74) *Attorney, Agent, or Firm* — Nelson Mullins Riley & Scarborough LLP

(57) ABSTRACT

An adaptable graphical user interface is provided. The interface may include a setup region to display a group of available solvers to a user and to display parameters for at least one of the group of solvers to the user. The interface may include an options region to display a first group of active options to a user without requiring a user input for the first group of active options, where the first group of active options is determined based on a selected one of the group of solvers. The options region may further display a second group of active options to the user when another one of the solvers is selected by the user, where the second group of active options differs from the first group of active options.

23 Claims, 22 Drawing Sheets

(56) References Cited

OTHER PUBLICATIONS

Harris, Daniel C.; Nonlinear Least-Squares Curve Fitting with Microsoft Excell Solver; 1998; Journal of Chemical Education, vol. 75, No. 1; pp. 119-121.*

Dotzauer, Erik et al.; "The TOMLAB Graphical User Interface for Nonlinear Programming"; 1999; AMO—Advanced Modeling and Optimization vol. 1, No. 2; pp. 9-16.*

Holmstrom, Kenneth; "The TOMLAB v2.0 Optimization Environment"; 2000; Sixth Meeting of the Nordic Section of the Mathematical Programming Society. Proceedings; pp. 1-23.*

Holmstrom, Kenneth; "TOMLAB's v2.0 Users Guide"; 2000; Technical Reort IMa ; pp. 1-188.*

Holmstrom, Professor Kenneth; "Practical Optimization with the TOMLAB Environment in Matlab"; 2001; Proceedings of the 42nd SIMS Conference; pp. 1-19.*

Frontline Systems, Inc., Premium Solver Platform, XPRESS Solver Engine, User Guide, Version 5.5E (2003).

Lysiak, Keith et al., "A Generalized MATLAB-based Distributed-computing Optimization Tool," IEEE/ACES International Conference on Wireless Communications and Applied Computational Electromagnetics, pp. 170-173 (2005).

* cited by examiner

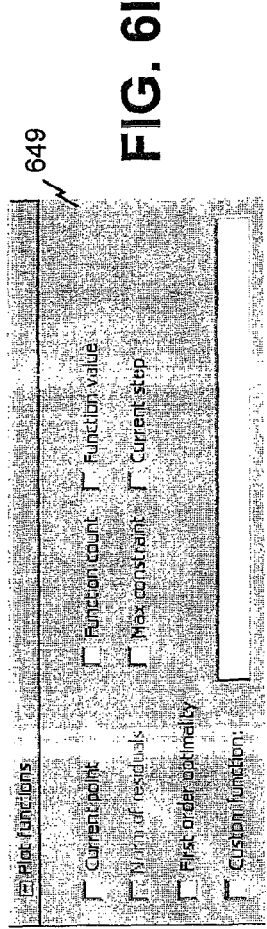
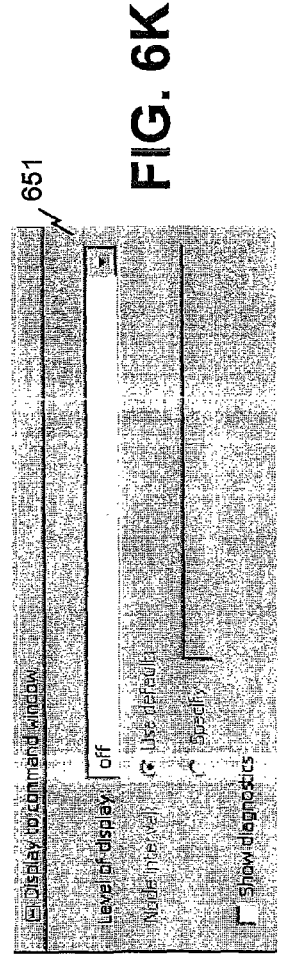
FIG. 6I
FIG. 6J
FIG. 6K

USER CONFIGURED OPTIMIZER

RELATED APPLICATIONS

The instant application is a continuation-in-part of U.S. Pat. No. 8,055,598 filed Aug. 8, 2007, which is a continuation-in-part of U.S. patent application Ser. No. 11/652,262 filed Jan. 10, 2007 and U.S. patent application Ser. No. 10/198,510 filed Jul. 17, 2002, the contents of which are herein incorporated by reference in their respective entireties.

BACKGROUND INFORMATION

Users in disciplines, such as mathematics, science, engineering, finance, statistics, medicine, etc., may wish to optimize an objective or model to determine a minimum or a maximum of an objective or model. Some of these users may wish to optimize using computers to take advantage of processing capabilities provided by modern computers. Performing computer based optimizations can become problematic for some users because complicated optimization solvers may be required, constraints may need to be specified, tolerances for the optimization may need to be determined or selected, etc. In addition, certain optimization problems may benefit when certain types of optimization solvers are used. For example, a first optimization solver may provide a first result that is less satisfactory than a second result that is provided when a second optimization solver is used.

Certain users may further have difficulty performing computer-based optimizations because these users may not be highly skilled in performing optimizations, selecting optimization solvers appropriate for a particular optimization problem, determining constraints for optimization problems, determining optimization tolerances, etc. In addition, these users may have difficulty interacting with the computer environment because these users may not be skilled programmers or may not be skilled at representing mathematical expressions or functions in forms that can be interpreted by computers (e.g., representing an optimization algorithm or optimization problem in a textual form that is compatible with the computer). The shortcomings of available computer-based optimization applications may discourage some users from using computers to solve optimization problems.

SUMMARY

In accordance with an embodiment, an interactive optimizer is provided. The interactive optimizer may include a graphical user interface to display a first pane to a user, where the first pane displays information about a group of available solvers, where one or more of the group of solvers are run against a problem to produce a result. The graphical user interface may display a second pane to the user, where the second pane displays options, where the options are displayed based on a selected one of the plurality of solvers, and wherein the options are displayed to the user without accepting a user input related to the second pane. The graphical user interface may further display the result to the user.

In accordance with another embodiment, a computer-readable medium is provided, where the computer-readable medium includes executable instructions optimize a problem when the instructions are executed. The computer-readable medium may include instructions for displaying a first pane to a user, where the first pane displays solvers to the user. The computer-readable medium may include instructions for displaying a second pane to the user, where the second pane displays options that are related to one or more of the solvers, and wherein the options are displayed to the user without requiring a user input related to the second pane. The computer-readable medium may include instructions for identifying options related to a selected one of the solvers and instructions for running the selected solver against a problem to produce a result. The computer-readable medium may include instructions for displaying the result to the user or for storing the result in a memory.

In accordance with still another embodiment, an adaptable graphical user interface is provided. The adaptable graphical user interface may include a setup region to display a group of available solvers to a user and to display parameters for at least one of the group of solvers to the user. The adaptable graphical user interface may include an options region to display a first group of active options to a user without requiring a user input related to the first group of active options, where the first group of active options is determined based on a selected one of the group of solvers. The options region may further display a second group of active options to the user when another one of the group of solvers is selected by the user, where the second group of active options differs from the first group of active options, wherein the displaying of the second group of active options represents adaptation of the graphical user interface based on a user input.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIGS. 6C-6K illustrate exemplary selections that can be made from the options region of FIG. 6B;

DETAILED DESCRIPTION

Figure 1:
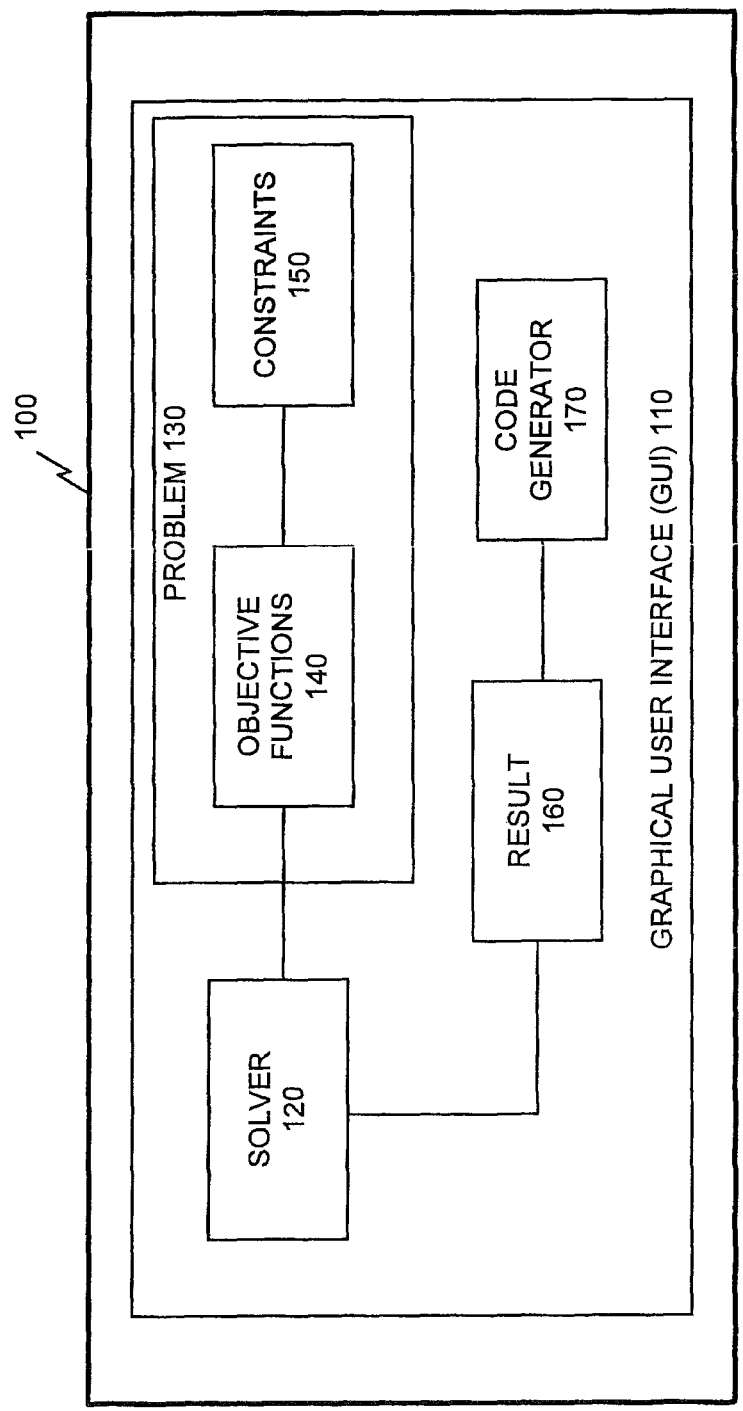
FIG. 1 illustrates an exemplary system that can be configured to practice an exemplary embodiment.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Conventional computing applications may be inadequate for solving certain types of optimization problems, such as technical optimization problems that can be encountered in fields like science, engineering, medicine, economics, etc. For example, a conventional computing application may perform processing operations based on information entered via a text-based interface (e.g., a command line interface). Users may find it difficult to convert complex optimization problems and/or parameters into a syntax that can be entered into the text-based interface and interpreted by the computer.

Conventional computing applications may also make it difficult for a user to try a variety of optimization solvers on a problem because the user may not know what optimization solvers are available, may not understand differences between one optimization solver and another optimization solver (e.g., parameters that differ between the two solvers, strengths or weaknesses of one solver versus the other solver for a given problem, etc.). Users may need to look elsewhere, such as in hardcopy user guides, textbooks, etc., to find information about optimization solvers used with the computing applications (e.g., information on the behavior of available solvers). The shortcomings associated with conventional computer-based optimization solvers may leave users dissatisfied (e.g., due to the difficulty and amount of time it takes to setup and perform optimizations).

Conventional computing applications may also make it difficult for a user to efficiently process a large number of optimization problems using an optimization solver. For example, a conventional application may require that a user enter an optimization problem via a command line each time the solver is run. For large numbers of optimization problems, the user may have to setup each optimization problem and invocation of the solver, which may significantly lengthen total time spent by the user for solving the set of problems. These cumbersome interactions may discourage certain users from taking advantage of computerized optimizations.

Exemplary embodiments provide an integrated optimizer that allows the user to select a solver from a list of available solvers, configure a selected solver, run the selected solver, obtain help with setting up or using the selected solver, and display results for the selected solver using a single graphical user interface (GUI). Exemplary embodiments may allow a user to enter information, e.g., an objective function, using a mathematics editor, a text editor, a graphical editor (e.g., an editor that uses graphical representations), etc., through the integrated GUI. Users that do not have expertise in computer programming, using optimizers, etc., may find interactions with exemplary embodiments to be intuitive as compared to user interactions with conventional computer-based optimization solvers.

For example, an exemplary embodiment may provide an interactive optimizer that uses a GUI to allow a user to select among a number of system or user provided optimization solvers. For example, the GUI may display a number of regions (e.g., panes, windows, etc.) to the user that allow the user to specify optimization solvers and/or other information. For example, the GUI may further provide the user with information about options associated with a selected optimization solver. For example, an options region of the GUI may identify parameters that need to be specified for a selected solver and/or may provide the user with suggestions on how to choose appropriate parameters. The GUI may further include a reference region that provides the user with help and/or other types of information that may be useful in choosing an optimization solver, setting up a selected optimization solver, running a selected optimization solver, etc. GUIs used with exemplary embodiments may be displayed using one or more display devices operated by one or more users (e.g., a first region may be displayed on a first display device and a second and third region may be displayed on a second display device).

Exemplary embodiments may further allow the user to generate executable code based on a selected optimization solver and related options. For example, a user may need to process a data set of 1000 problems. The user may interactively select and run one or more optimization solvers using the GUI until the user is satisfied that a selected solver will produce satisfactory results when run on problems in the data set. The user may make a selection (e.g., by clicking a mouse button) to generate code for the selected optimization solver and associated options. The user may run the generated code against the data set to efficiently process problems in the data set. For example, the generated code may automatically read problems and apply the specified optimization solver to the problems to produce a number of results. Exemplary embodiments may further generate outputs, such as reports, according to determined parameters, such as style guides.

Exemplary embodiments may operate with statically typed programming languages or dynamically typed programming languages to provide interactive optimization capabilities in a number of computing environments. Exemplary embodiments may further be implemented locally on a single machine or may be implemented in distributed (e.g., parallel) computing environments. For example, an interactive optimization application may be provided to a remote client device using a web service hosted by a server. The web service may also allow the client to perform optimizations using a number of parallel processors.

Exemplary embodiments can provide users with real-time feedback on the operation and/or configuration of optimization solvers without requiring that the users interact with a standalone text-based editor, without requiring that the users have an expertise in using optimization solvers, etc. The configurability and ease of use provided by exemplary embodiments of the interactive optimizer makes these exemplary embodiments useful for educational institutions, corporations, government institutions, medical facilities, etc., for processing single optimization problems or large data sets that can contain substantially any number of optimization problems.

Exemplary System

FIG. 1 illustrates an exemplary system 100 that can be configured to practice an exemplary embodiment. System 100 may include computer 100, GUI 110, solver 120, problem 130, objective functions 140, constraints 150, result 160 and code generator 170. The embodiment of FIG. 1 and/or embodiments shown in other figures included herein are exemplary and alternative embodiments may include more devices, fewer devices, and/or devices in arrangements other than the arrangements shown in the figures included herein.

Computer 100 may include a device capable of performing processing operations, display operations, communication operations, etc. For example, computer 100 may include a desktop computer, a laptop computer, a client, a server, a mainframe, a personal digital assistant (PDA), a web-enabled cellular telephone, a smart phone, smart sensor/actuator, or another computation or communication device that executes instructions to perform one or more activities and/or generate one or more results.

Computer 100 may further perform communication operations by sending data to or receiving data from another device, such as a server. "Data," as used herein, may refer to any type of machine-readable information having substantially any format that may be adapted for use in one or more networks and/or with one or more devices. Data may include digital information or analog information. Data may further be packetized and/or non-packetized.

GUI 110 may include an interface that allows a user to interact with a computing device, such as computer 100. For example, GUI 110 may allow a user to interact with icons and/or other graphical representations displayed to the user via one or more display devices connected to computer 100. GUI 110 may accept user inputs from an input device, such as a keyboard, mouse, trackball, biometric input device, etc. In one embodiment, GUI 110 may use widgets and textual labels to provide information to a user. Embodiments of GUI 110 may be user configurable (e.g., a user may change the look and/or feel of GUI 110) and/or GUI 110 may not be user configurable (e.g., the arrangement of information on GUI 110 may be determined by a system). Embodiments of GUI 110 may be configured to adapt based on user interactions with computer 100. For example, GUI 110 may adapt based on problem selections, selected display regions (e.g., based on a user selecting an options pane or another pane in GUI 110), etc.

Exemplary embodiments of GUI 110 may be rendered to a user using software applications, such as a web browser. Embodiments of GUI 110 may further be rendered on one or more displays of computer 100 based on local processing operations (e.g., operations performed on computer 100) or may be rendered to the display based on processing operations performed by a remote device. For example, GUI 110 may display information that is received from a web service running on a remote server.

Solver 120 may include hardware or software based logic that performs optimization operations on behalf of a device or a user. For example, solver 120 may be an optimization solver that operates to minimize or maximize a function by systematically choosing values of real or integer variables from an allowed set. Solver 120 may operate with one or more objective functions 140 to minimize or maximize the function.

Problem 130 may include information that is operated on by solver 120. Problem 130 may be user defined (e.g., by entering information via a keyboard), may be system defined (e.g., retrieved from a storage device), or may be defined by an entity (e.g., an instructor, a third party device, etc.). In an embodiment, such as shown in FIG. 1, problem 130 may include objective functions 140 and/or constraints 150. Other embodiments of problem 130, not shown in FIG. 1, may include other types of information.

Objective functions 140 may include a number of functions that are used by solver 120 to perform optimizations. Objective functions 140 may reside locally on computer 100 or may be accessed from remote devices via computer 100 over a network. Objective functions 140 may be system defined (e.g., computer 100 may include a library of available objective functions) or objective functions 140 may be user defined (e.g., a user may enter one or more objective functions that can be used in problem 130 and/or by solver 120).

Constraints 150 may include values or equations that are used by objective functions 140 and/or solver 120. For example, constraints 150 may act as bounds, or limits, that are true while an optimization is performed on problem 130.

Result 160 may include information produced when solver 120 operates on problem 130. For example, a result may include a minimum, a maximum, and/or a point at which a minimum/maximum is achieved. Result 160 may be displayed to a user via GUI 110 (e.g., via a graph, tabular data, etc.), sent to a destination (e.g., another computer, a printer, a remote display, etc.), stored, etc.

Code generator 170 may include hardware or software based logic that generates code based on an input. For example, code generator 170 may generate code that implements a solver that was setup by a user via GUI 110. For example, a user may interact with GUI 110 to create a solver that can be run against a data set that includes multiple problems. The user may generate code for the solver using code generator 170. The user may use the generated code to operate on the data set. Embodiments of code generator 170 may further be used to generate other types of code, such as code that reproduces GUI 110, information displayed in GUI 110 (e.g., reference information, options information, etc.), etc.

Exemplary Functional Diagram

Figure 2:
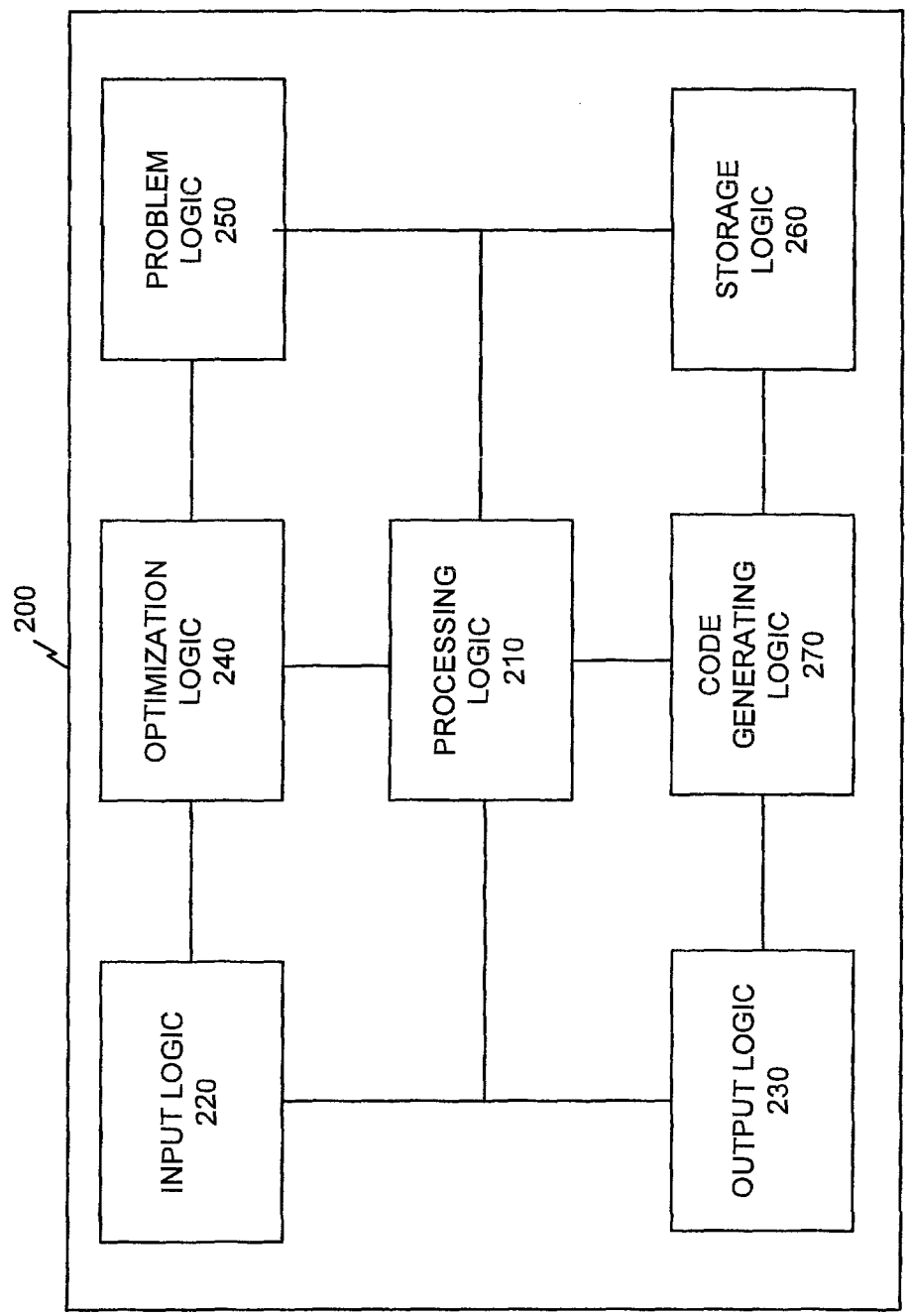
FIG. 2 illustrates an exemplary functional diagram of a graphical user interface (GUI) based optimizer.

FIG. 2 illustrates an exemplary functional diagram. Functional diagram 200 can include processing logic 210, input logic 220, output logic 230, optimization logic 240, problem logic 250, storage logic 260 and code generation logic 270. Logic in FIG. 2 can reside on a single device, such as computer 100, or the logic of FIG. 2 can be distributed across multiple devices. Moreover, the logic of FIG. 2 can be implemented in hardware based logic, software based logic, a combination of hardware and software based logic (e.g., hybrid logic, wetware, etc.), etc. The implementation of FIG. 2 is exemplary, and computer 100 and/or other devices may include more or fewer functional components without departing from the spirit of the invention.

Processing logic 210 may include logic to process instructions or data. For example, processing logic 210 may instruct other logic to perform operations, may parse problem 130 into a number of portions that can be sent to different processors, combine results received from different processors into a single result 160, perform arithmetic operations, etc. Processing logic 210 may be implemented in a single device that can include one or more cores, or processing logic 210 may be implemented in a number of devices that can be local with respect to each other or remote with respect to each other (e.g., distributed over a network).

Input logic 220 may receive information from a user, a component in computer 100, another device, an object (e.g., a software object), etc. Output logic 230 may send information to a destination component, device, object, etc. For example, output logic 230 may send result 160 to a display device where result 160 is displayed to a user. In one embodiment, input logic 220 and output logic 230 may include a code-based interface (e.g., an application program interface (API)), and in another implementation, may include a hardware interface, such as a network interface card (NIC).

Optimization logic 240 may include logic that performs one or more optimizations. For example, optimization logic 240 may operate in solver 120 to implement a number of optimizations based on a user selection. Problem logic 250 may include logic that implements problem 130 or information related to problem 130, such as objective functions 140, constraints 150, and/or other types of information that can be used with problem 130.

Storage logic 260 may store user inputs, optimizations, constraints, results, variables, etc. Storage logic 260 may be implemented via static storage (e.g., a hard disk) or dynamic storage (e.g., random access memory). Storage logic 260 may reside on computer 100 or may be remote with respect to computer 100. Storage logic 260 may further include a single storage device or a number of storage devices (e.g., an array of storage devices).

Code generating logic 270 may generate code. Code generating logic 270 may be user controlled or may be controlled by a device. Code generating logic 270 may further generate code in substantially any language or format based on the type of generation logic used and/or based on selections made with respect to parameters associated with code generating logic 270.

Exemplary User Interface

Figure 3:
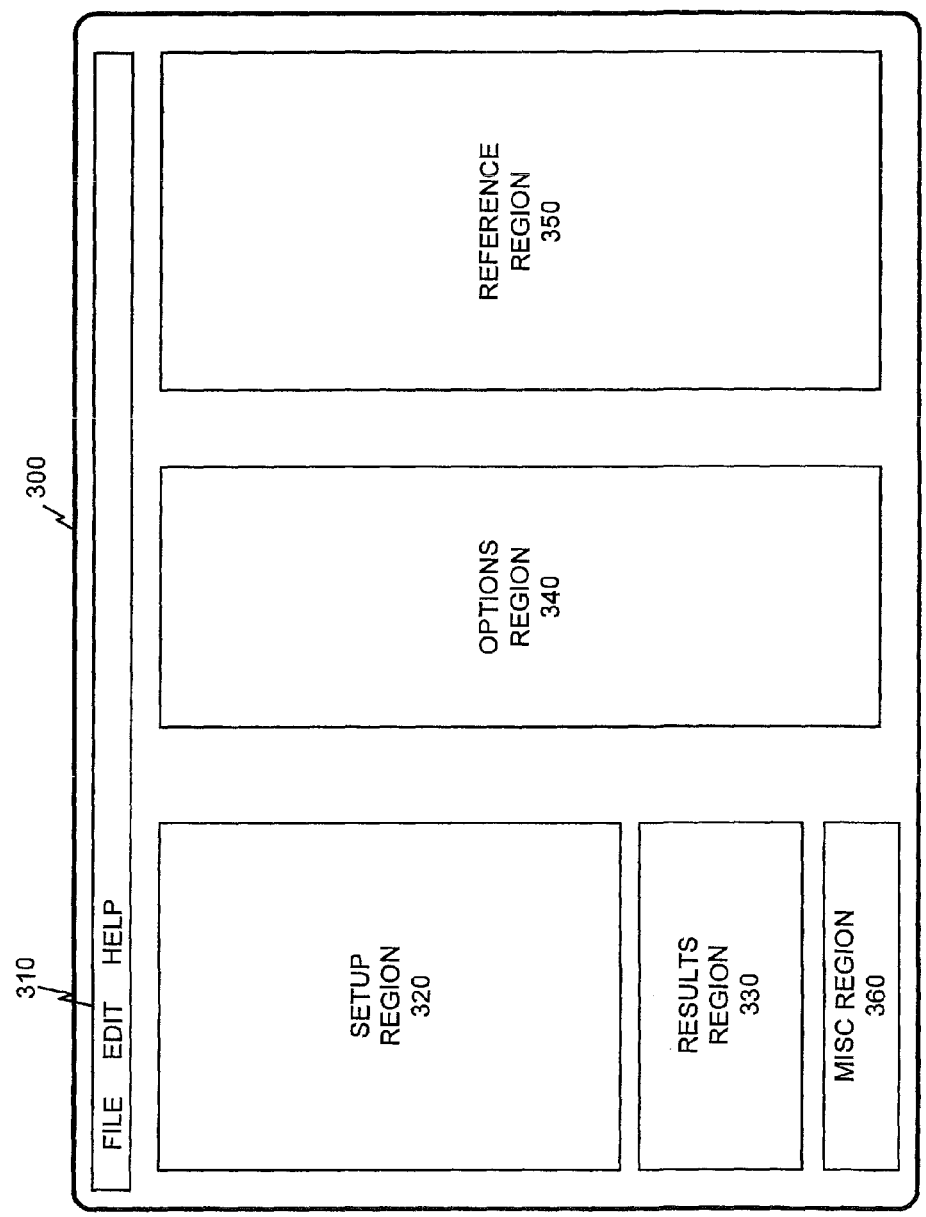
FIG. 3 illustrates an exemplary GUI that can be used with an optimizer.

FIG. 3 illustrates an exemplary user interface, such as a GUI 300, that can be used with an exemplary embodiment. GUI 300 may include a toolbar 310, setup region 320, results region 330, options region 340, reference region 350, and/or miscellaneous region 360. GUI 300 is exemplary and other embodiments may include more regions, fewer regions, and/or regions in arrangements that differ from the arrangement of FIG. 3. Embodiments of GUI 300 may allow a user to configure the layout and content thereof, or GUI 300 may include a layout that cannot be configured by a user.

In the embodiment of FIG. 3, GUI 300 includes a number of regions, also referred to herein as "panes". Regions may include portions of a display area that include certain types of information. Regions may be defined by borders, patterns, colors, etc., to help distinguish one region from another region or from other information in GUI 300. Regions may be selectable by the user via an input device, such as a mouse. For example, a user may make a region an active region by clicking on a border for the region, where an active region allows the user to enter information into the region. The user may make another region active by clicking on that region. In alternative embodiments, regions or panes may be displayed in more than one window within a single GUI or spread across multiple GUIs without departing from the spirit of the invention (e.g., multiple GUIs may be spread across multiple display devices in one embodiment).

Toolbar 310 may include information that allows a user to perform operations using GUI 300. For example, toolbar 310 may include headings (e.g., File, Edit, Help, etc.) that provide the user with drop down menus when one or more headings are selected by a user. Setup region 320 may include information that allows the user to select a solver (e.g., a type of optimization solver), an algorithm, problem constraints, etc.

Results region 330 may include information associated with a result generated by a solver. Options region 340 may include information that is used with setup region 320 to configure a solver, algorithm, problem, constraint, etc. For example, options region 340 may include information about iterations, tolerances for constraints or functions, etc.

Reference region 350 may include information that is related to setup region 320, results region 330, options region 340, etc. For example, reference region 350 may include help information that is related to a solver identified in setup region 320. Reference region 350 may also include links to additional information, advertising, etc. Miscellaneous region 360 may include other types of information that can be useful to a user of GUI 300. For example, region 360 may include a telephone listing of other users that are working with optimizers identified in setup region 320, information about disk usage, processing cycle usage, etc.

Exemplary embodiments may display information associated with GUI 300 in a single window or may spread information associated with GUI 300 across multiple windows. For example, setup region 320 may be displayed in a first window and options region 340 and reference region 350 may be displayed in a second window, where the second window may be on a display device containing the first window or may be on a separate display device.

Exemplary Setup Region

Figure 4A:
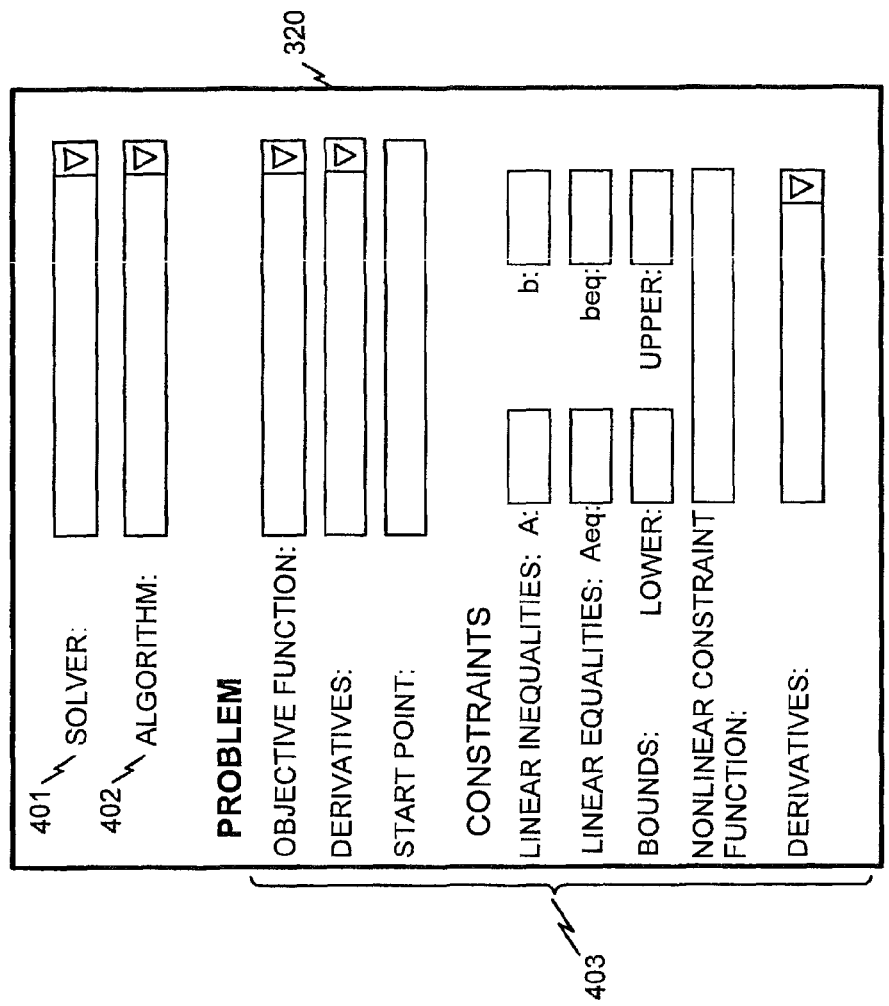
FIG. 4A illustrates exemplary setup region of a GUI for an exemplary optimizer.

FIG. 4A illustrates an exemplary setup region of GUI 300 for an exemplary solver. Setup region 320 may be displayed in a window on a display device and may include solver selector 401, algorithm selector 402, and problem area 403.

Figure 4D:
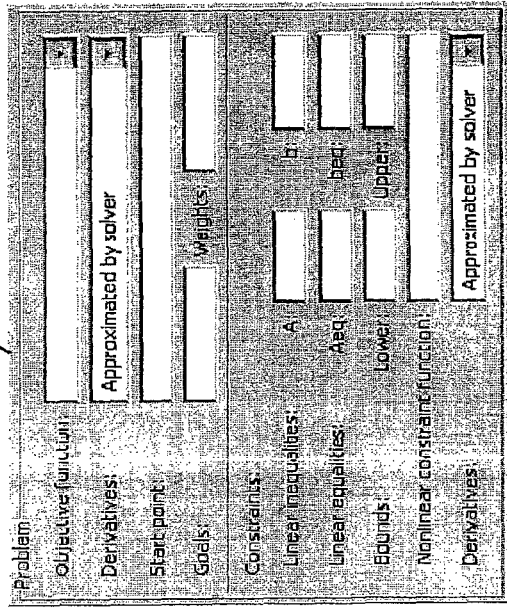
FIG. 4B illustrates an exemplary solver selector.
FIGS. 4C-4R illustrate exemplary solvers that can be used with an exemplary GUI.
Figure 4E:
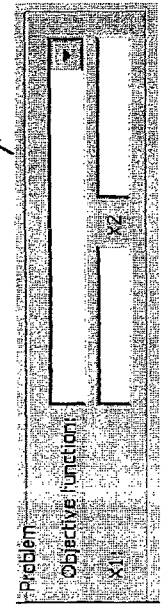
Figure 4B:
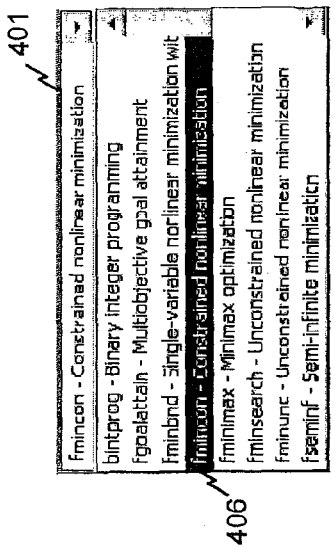

Solver selector 401 may include a drop down menu, such as that shown in FIG. 4B, that provides a user with a list of available solvers that can be used to solve a problem. Solvers identified in the drop down menu may be system defined (e.g., selected from a solver library stored in a storage device on computer 100) or may be user defined (e.g., a solver entered by a user using an editor, read from a file, retrieved from a remote location via a link, etc.). The solvers may be identified in the list, for example, by the name of the solver or some other form of identifier. The list may also provide a brief description of the solver, as shown in FIG. 4B. Embodiments of system 100 may include substantially any number of system defined and/or user defined solvers. Solver selector 401 may allow a user to indicate a selection by, for example, highlighting a background proximate to a name for a solver. For example, selection 406 (FIG. 4B) may identify a solver that has been selected for a particular problem.

Returning to FIG. 4A, algorithm selector 402 may allow a user to enter an algorithm, algorithm name, algorithm link, etc., for use on a problem. For example, in one embodiment a drop down menu can be provided to a user. In another embodiment, a user can type in the name of an algorithm or for a filename containing an algorithm using a keyboard or other type of input device.

Problem area 403 may include a portion of setup region 320 where a user enters information about a problem, such as an optimization problem. For example, a user may enter or select an objective function, derivatives and/or a starting point for processing. In one embodiment, problem area 403 may include constraints information that allows a user to enter or select information related to constraints 150 that are used with a problem, such as problem 130. Constraints information may include linear inequalities or equalities, bounds, nonlinear constraint functions, derivatives, etc. Other embodiments of setup region 320 may include other types of information without departing from the spirit of the invention.

In an exemplary embodiment, setup region 320 may allow a user to select one of twenty one solvers that can be applied to an optimization problem. For example, a user may select a solver to:

(1) solve a binary integer programming problem (solver name: bintprog);

(2) solve a multiobjective goal attainment optimization problem (solver name: fgoalattain);

(3) find the minimum of a single-variable function on a fixed interval (solver name: fminbnd);

(4) find a minimum of a constrained nonlinear multivariable function (solver name: fmincon);

(5) find the minimum of the worst-case value of a set of multivariable functions (solver name: fminmax);

(6) find the minimum of an unconstrained nonlinear multivariable functions using a derivative-free method (solver name: fminsearch);

(7) find a minimum of an unconstrained nonlinear multivariable function (solver name: fminunc);

(8) find the minimum of a semi-infinitely constrained nonlinear multivariable function (solver name: fseminf);

(9) solve a system of nonlinear equations (solver name: fsolve);

(10) find a root (zero) of a nonlinear equation (solver name: fzero);

(11) solve a linear programming problem (solver name: linprog);

(12) solve a nonlinear curve fitting (data fitting) problem in the least-squares sense (solver name: lsqcurvefit);

(13) solve a constrained linear least-squares problem (solver name: lsqlin);

(14) solve a nonlinear least-squares problem (solver name: lsqnonlin);

(15) find the minimum of a nonnegative least-squares problem (solver name: lsqnonneg);

(16) solve a quadratic programming problem (solver name: quadprog);

(17) find a minimum of a (un)constrained nonlinear multivariable function using genetic algorithm (solver name: ga);

(18) solve a multiobjective nonlinear multivariable function using genetic algorithm (solver name: gamultiobj);

(19) find a minimum of a (un)constrained nonlinear multivariable function using derivative-free method (solver name: patternsearch);

(20) find the global minimum of a (un)constrained nonlinear multivariable function (solver name: GlobalSearch); and

(21) find multiple minima and the global minima of (un)constrained nonlinear multivariable function (solver name: MultiStart).

Other exemplary embodiments of setup region 320 may include additional solvers, fewer solvers, etc.

A user may select one of the twenty one solvers and may then define a problem by specifying a function to minimize. The user may further specify other parameters, such as a start point and/or constraints that may be specific to the selected solver. Exemplary embodiments may provide a user with windows that are unique to a selected solver to facilitate entry of correct information by the user. For example, FIGS. 4C-4R illustrate exemplary solvers and windows that can be used with an exemplary GUI in system 100.

Figure 4C:
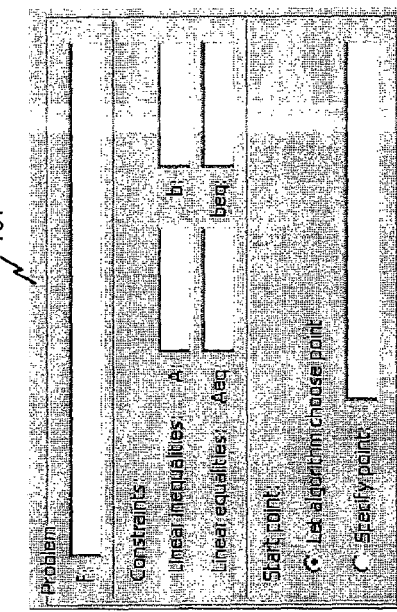
Figure 4G:
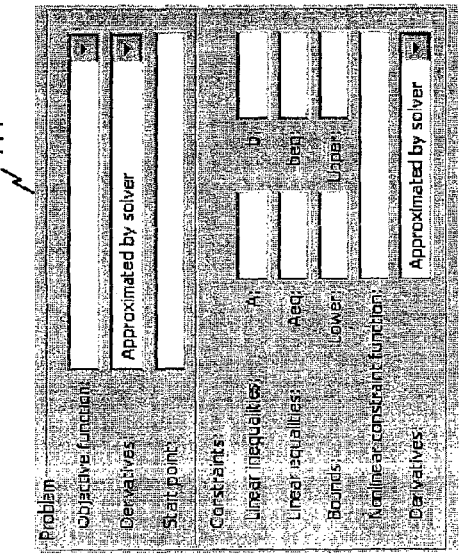
Figure 4I:
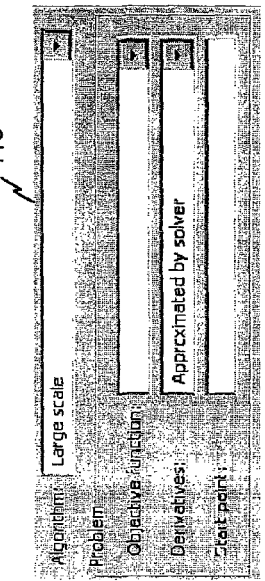

A user may select solver bintprog and may be provided with setup window 407 (FIG. 4C). The user may specify a problem as a function (e.g., a linear function), constraints that can include linear inequalities or linear equalities, and/or a start point.

Setup window 408 (FIG. 4D) may be provided to the user when the user selects solver fgoalattain. The user may enter an objective function to minimize, derivatives, a start point, goals that the objective function attempts to obtain, weights to control the relative underattainment or overattainment of the objectives, constraints that can include linear inequalities or linear equalities, lower or upper bounds on variables used with the solver, a nonlinear constraint function to define nonlinear constraints, and/or derivatives that can be supplied in the nonlinear constraint function or approximated by the solver.

Setup window 409 (FIG. 4E) may be provided to the user when the user selects solver fminbnd. The user may enter an objective function that is minimized, a left endpoint of an interval over which the objective function is minimized (x1), and/or a right endpoint of an interval over which the objective function is minimized (x2).

Figure 4F:
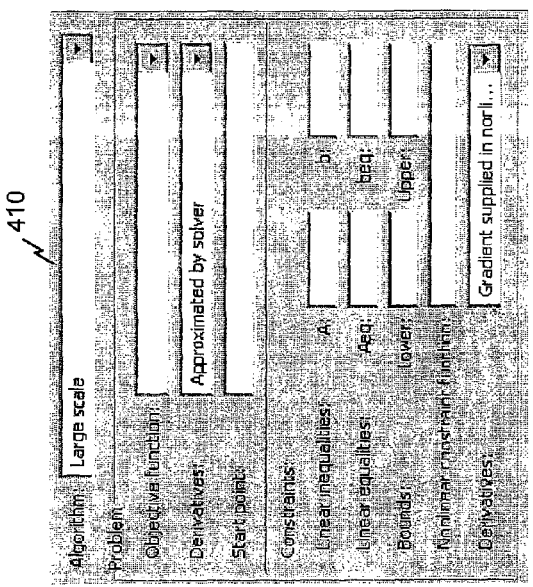

Setup window 410 (FIG. 4F) may be provided to the user when the user selects solver fmincon. The user may specify whether he/she wants to use a large scale algorithm or a medium scale algorithm with solver fmincon. The user may enter the objective function to minimize, derivatives, a start point for the algorithm, one or more constraints, linear inequalities, linear equalities, lower and/or upper bounds, a nonlinear constraint function, and/or derivatives for the nonlinear constraint function.

Setup window 411 (FIG. 4G) may be provided to the user when the user selects solver fminimax. The user may enter an objective function to minimize, derivatives, constraints that can include linear inequalities and/or linear equalities, lower or upper bounds, a nonlinear constraint function, and/or derivatives for the nonlinear constraint function.

Figure 4H:

Setup window 412 (FIG. 4H) may be provided to the user when the user selects solver fminsearch. The user may specify an objective function to minimize and/or a start point.

Setup window 413 (FIG. 4I) may be provided to the user when the user selects solver fminunc. The user may specify whether he/she wants a large scale algorithm or a medium scale algorithm. The user may further specify an objective function to minimize, derivatives for the objective function and/or a start point for the algorithm.

Figures 4J, 4K, 4L, 4M:
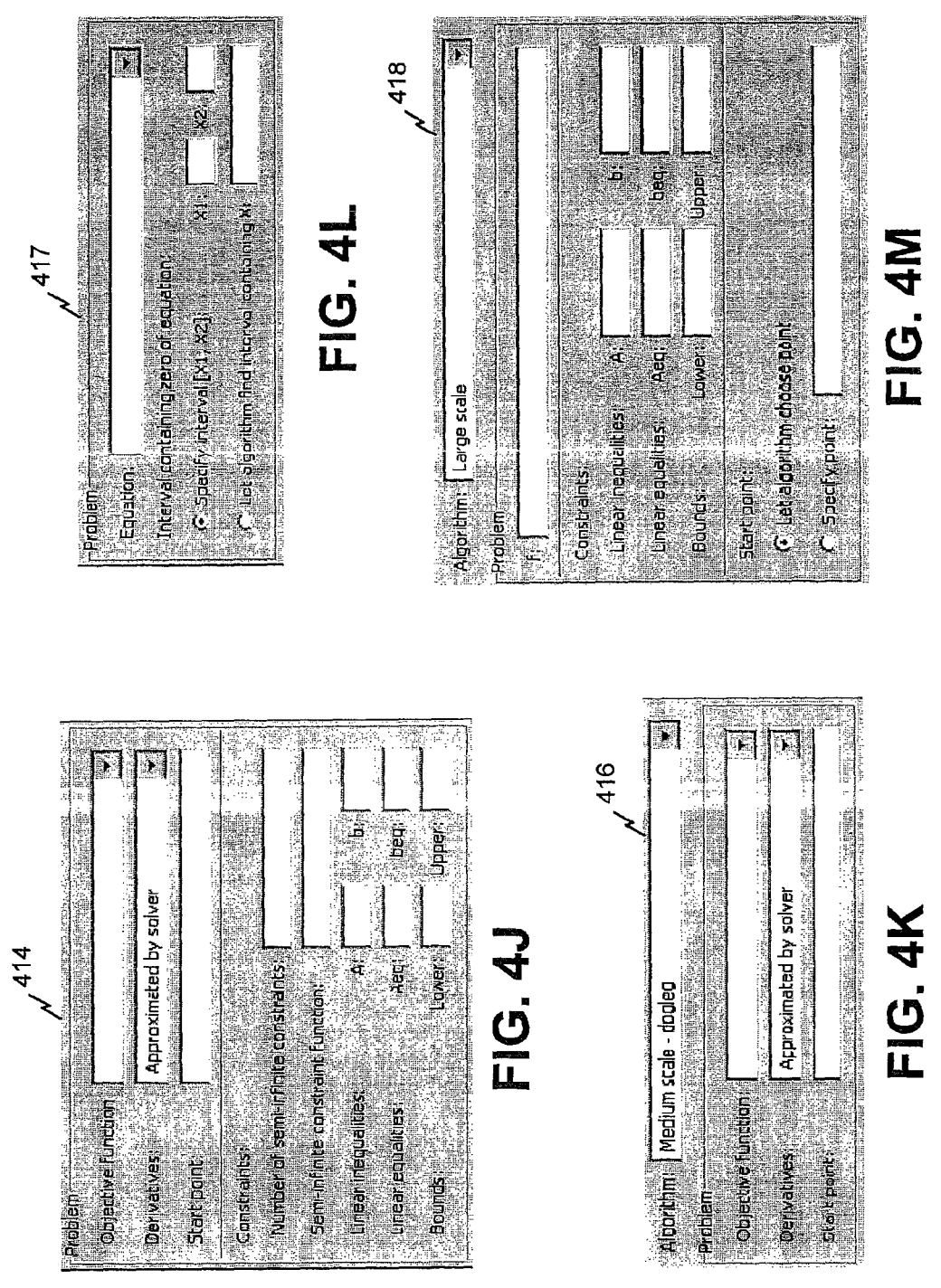

Setup window 414 (FIG. 4K) may be provided to the user when the user selects solver fseminf. The user may specify an objective function to minimize, derivatives that may specify whether a gradient is supplied by the user in the objective function or whether the gradient should be approximated by the solver, a start point for the algorithm, a number of semi-infinite constraints that are in a constraints function, a semi-infinite constraints function, linear inequalities, linear equalities, and/or lower and/or upper bounds on variables used with the solver.

Setup window 416 (FIG. 4J) may be provided to the user when the user selects solver fsolve. The user may specify whether a large scale or a medium scale algorithm should be used. For example, one embodiment may allow the user to select among the trust region dogleg, the Levenberg-Marquardt, or the Gauss-Newton algorithm when the user indicates that a medium scale algorithm should be used. The user may further specify an objective function that describes a system of nonlinear equations that the user wants to solve, derivatives that specify whether the Jacobian is supplied in the objective function or whether the Jacobian should be approximated by the solver, and/or a start point for the algorithm.

Setup window 417 (FIG. 4L) may be provided to the user when the user selects solver fzero. The user may specify a function (or equation) whose zero is to be computed and/or an interval that contains a zero of the function (equation). In one embodiment, a user may specify an interval using two parameters, such as x1 and x2, or the user may allow the algorithm to find an interval containing a point by specifying a single point, such as x.

Setup window 418 (FIG. 4M) may be provided to the user when the user selects solver linprog. The user may specify whether a large scale algorithm or a medium scale algorithm should be used. The user may further specify a function to minimize that may contain coefficients of a linear function, constraints, linear inequalities, linear equalities, lower bounds, upper bounds, and/or a start point for the algorithm.

Figure 4N:
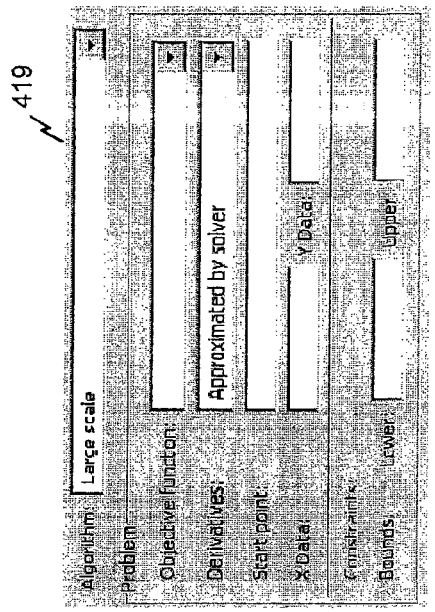

Setup window 419 (FIG. 4N) may be provided to the user when the user selects solver lsqcurvefit. The user may specify whether a large or medium scale algorithm should be used. The user may further specify an objective function whose sum of squares is to be minimized, derivatives, a start point, input data (x data), output data (y data) to which the solver finds coefficients to best fit the specified objective function, lower bounds, and/or upper bounds.

Figure 4O:
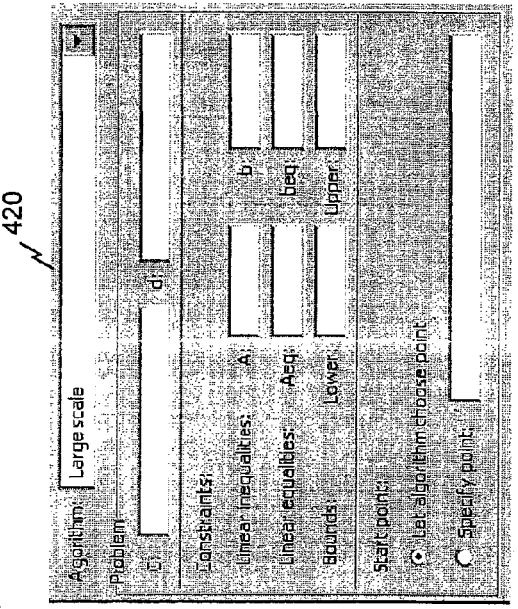
Figure 4R:
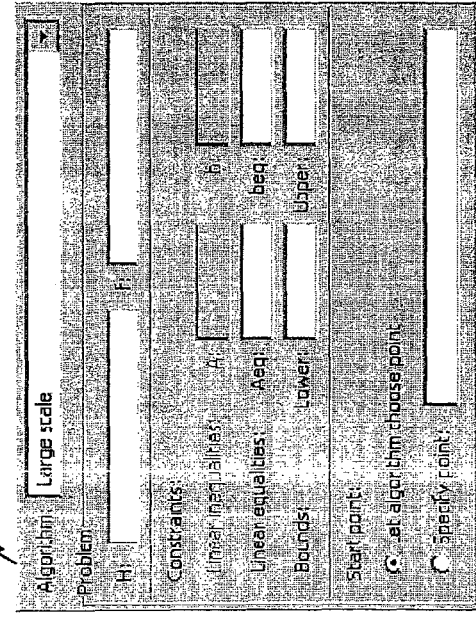
Figure 4Q:
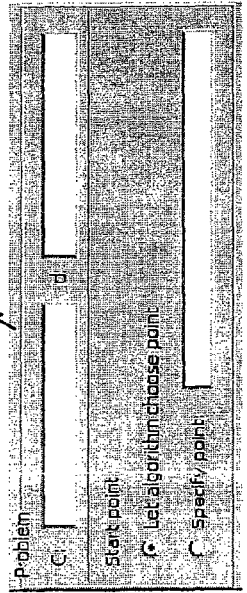

Setup window 420 (FIG. 4O) may be provided to the user when the user selects solver lsqlin. The user may specify whether a large or medium scale algorithm should be used.

The user may further specify a matrix C and a vector d to solve the linear system C*x=d in the least squares sense subject to specified constraints, constraints that may include linear inequalities or linear equalities, lower bounds, upper bounds, and/or a start point for the algorithm.

Figure 4P:
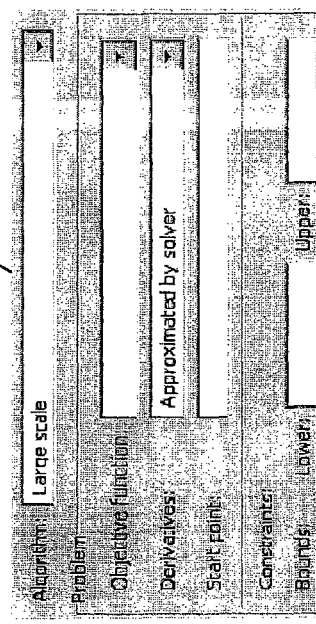

Setup window 421 (FIG. 4P) may be provided to the user when the user selects solver lsqnonlin. The user may specify whether a large or medium scale algorithm should be used. The user may further specify an objective function to be minimized (e.g., a nonlinear vector function whose sum of squares is to be minimized), derivatives, a start point, lower bounds, and/or upper bounds.

Setup window 422 (FIG. 4O) may be provided to the user when the user selects solver lsqnonneg. The user may enter a matrix C and vector d that solves the system C*x-d in the least-squares sense subject to x≥0 where both C and d can be real, and/or a start point.

Setup window 423 (FIG. 4R) may be provided to the user when the user selects solver quadprog. The user may specify whether large or medium scale algorithms should be used. The user may further specify a matrix H and vector f to minimize (e.g., to minimize ½*x'*H*x+f*x subject to specified constraints), constraints (e.g., linear equalities or inequalities), lower bounds and/or upper bounds.

Exemplary Results Region

Figure 5:
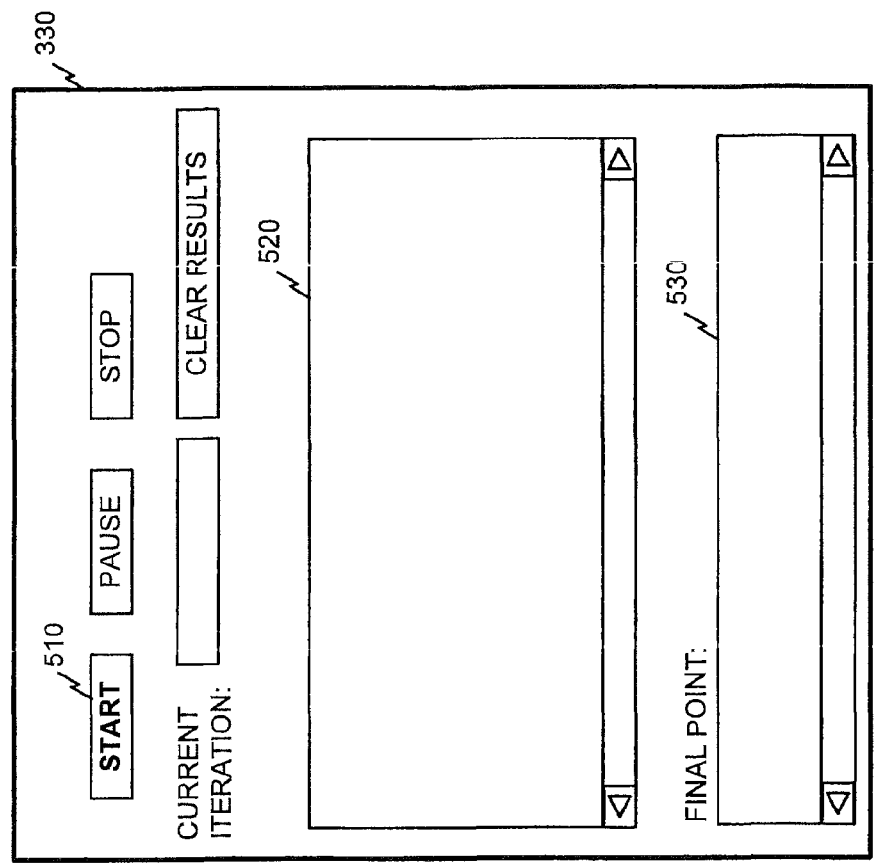
FIG. 5 illustrates an exemplary implementation of a results region in an exemplary GUI.

FIG. 5 illustrates an exemplary implementation of results region 330 in an exemplary GUI. Results region 330 may display results produced when one or more algorithms (e.g., optimization algorithms) are run. In on exemplary embodiment, results region 330 may include buttons 510 that can include a start button, a pause button, and/or a stop button. For example, selecting the start button using a pointing device may commence an optimization run. Results region 330 may include a portion in which information about iterations is displayed. For example, a number identifying a current iteration for an optimization may be displayed.

Results region 330 may further include a results window 520 in which results for an optimization are displayed to a user. Results window 520 may display text, graphics, and/or other types of information to a user depending on particular configurations of computer 100 and/or solver 120. Final point window 530 may display information about a final point associated with an optimization run.

Exemplary Options Region

Figure 6A:
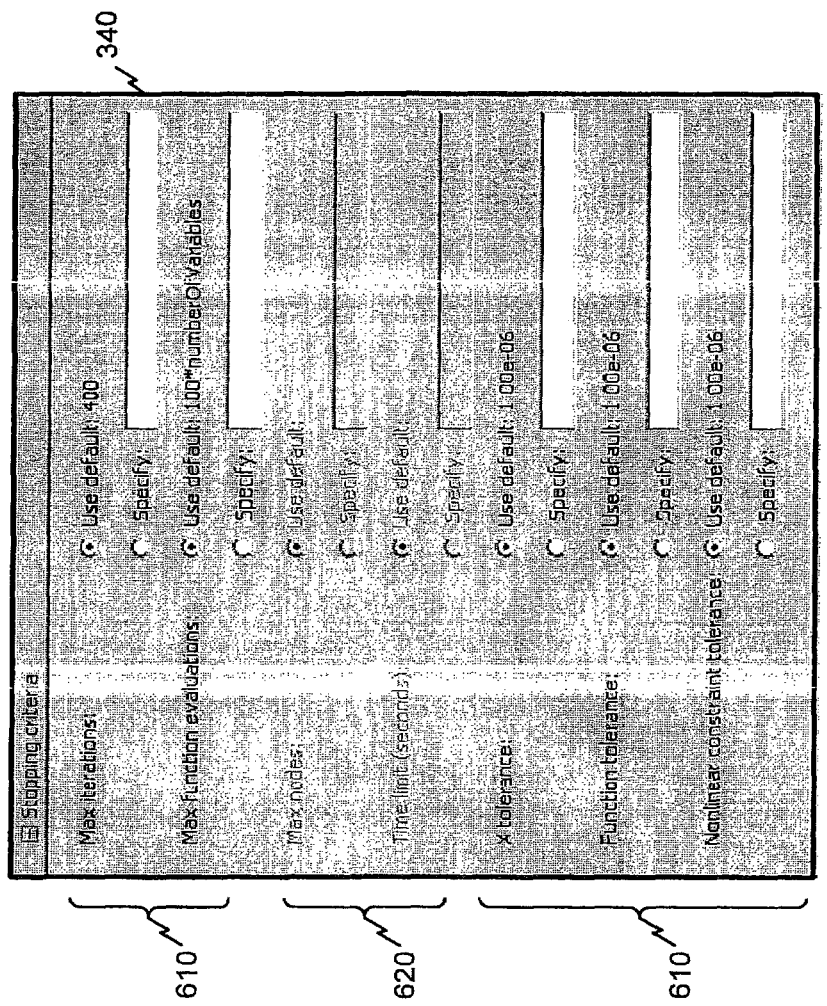
FIG. 6A illustrates an exemplary implementation of an options region in an exemplary GUI.

FIG. 6A illustrates an exemplary implementation of options region 340 in an exemplary GUI. Options region 340 may include information that allows a user to specify parameters associated with one or more optimization runs. For example, a user may select a particular solver, such as fmincon, and computer 100 may display a particular configuration of options region 330 based on the selected solver. Assume, for sake of example, that the information in FIG. 6A is displayed when fmincon is selected. In FIG. 6A selections 610 may be active and may be identified by darker text as compared to text used to identify inactive portions 620 of options region 340.

Further assume that the user decides to select a different solver, such as quadprog. Options region 340 may change so that some or all of regions 610 may become inactive while some or all of previously inactive regions become active. Options region 340 may adapt based on a selected solver or based on other user selections so as to allow a user to select only meaningful information and/or to enter only meaningful information into computer 100. Options region 340 may further adapt by displaying, adding, removing, etc., items based on a selected solver.

Figure 6B:
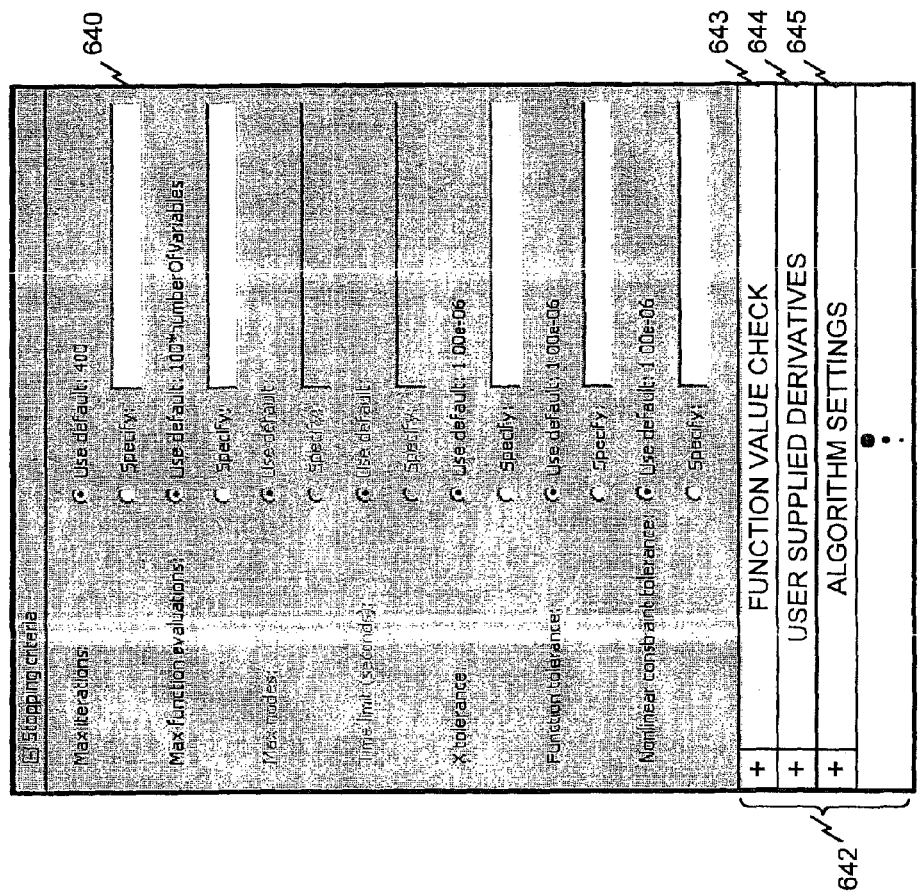
FIG. 6B illustrates an alternative implementation of an options region.
Figure 6C:
Figure 6D:
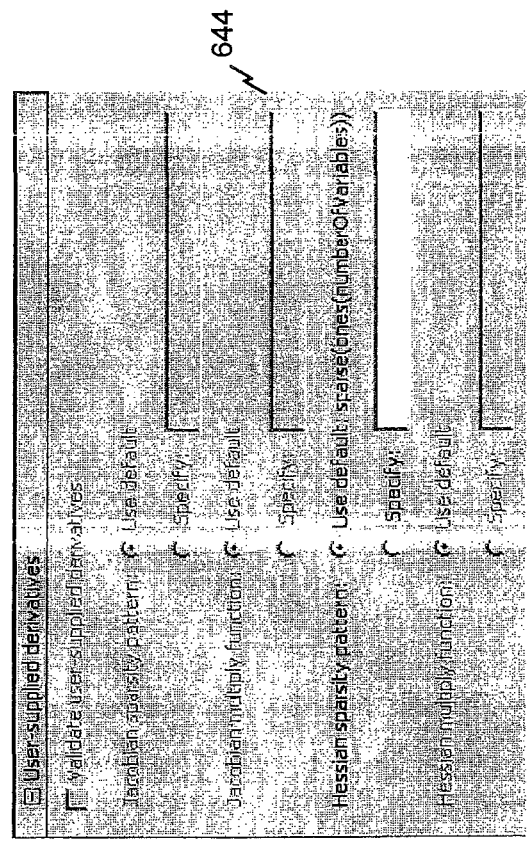
Figure 6E:
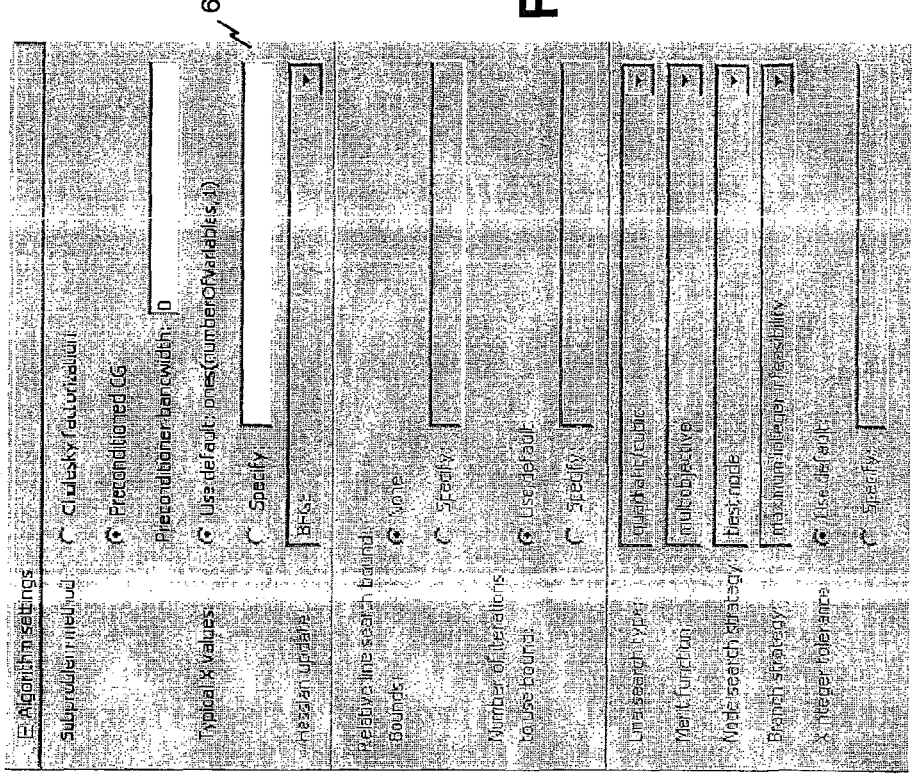
Figure 6F:
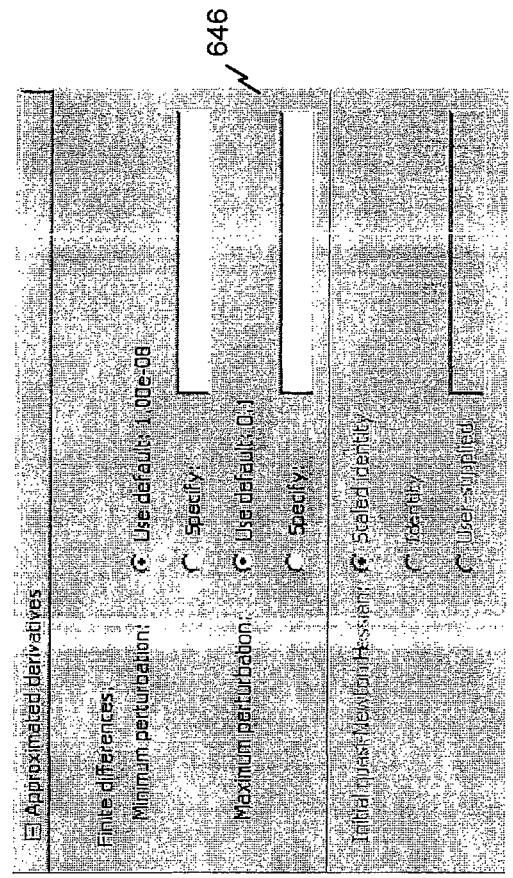
Figures 6G, 6H:
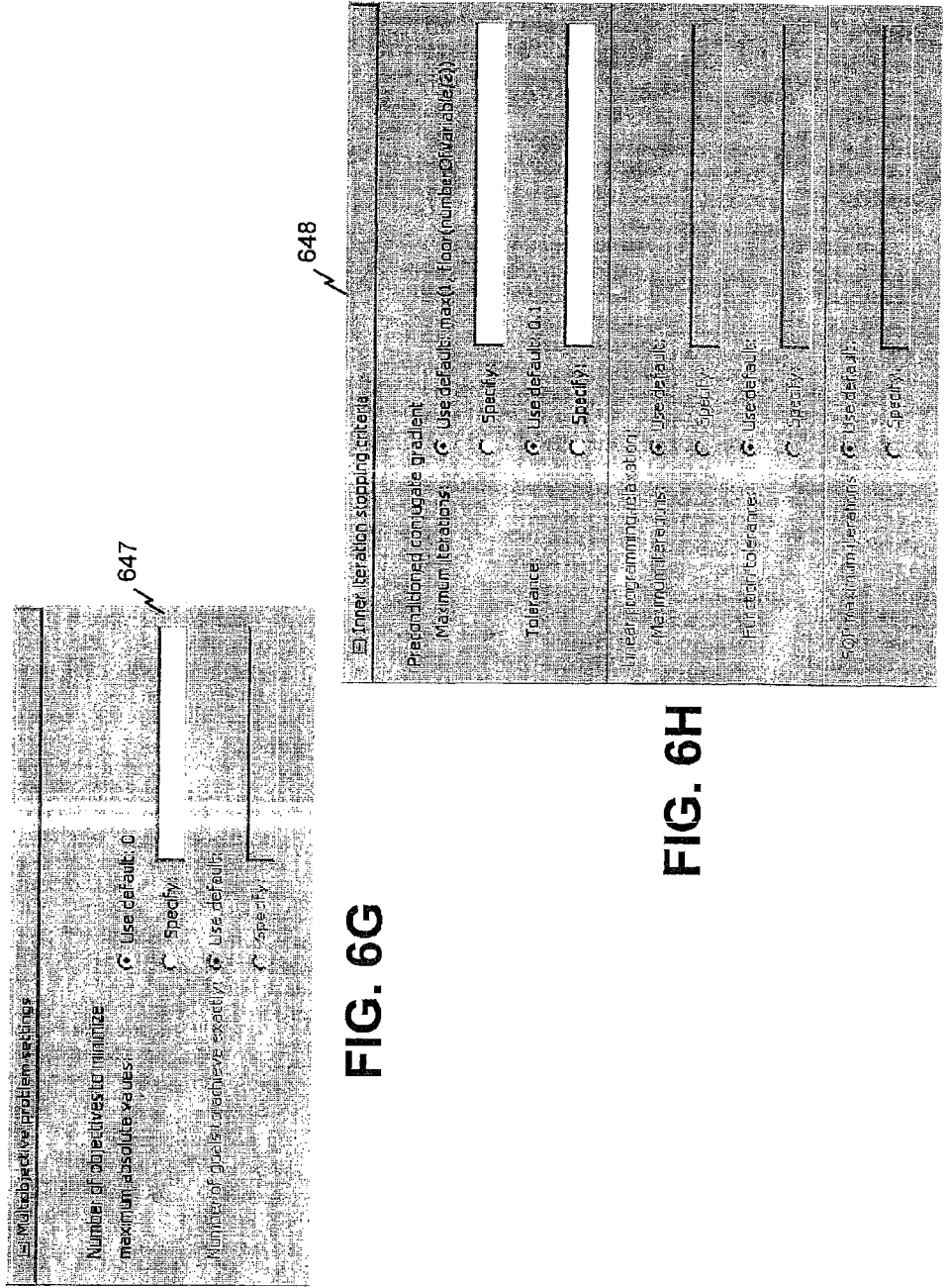

FIG. 6B illustrates an alternative implementation of an options region (e.g., options region 640). The implementation of options region 640 illustrated in FIG. 6B illustrates the information from FIG. 6A along with additional selections 643, 644, and 645. Selections 643, 644 and 645 may be collapsed in a first state (shown in FIG. 6B as group 642) and expanded in a second state (not shown in FIG. 6B). Icons, such as a "+" may identify that a collapsed selection includes information that can be displayed when the selection is expanded. For example, selection 643 may identify a function value check that includes information about values returned by a user supplied objective function or nonlinear constraint function. Information relevant to the function value check may be displayed for the user when the user selects the function value check (e.g., by clicking a mouse button). Exemplary embodiments may include substantially any number of selections 643-645, etc.

FIGS. 6C-6K illustrate exemplary selections that can be made from options region 640 of FIG. 6B. Specifically, FIGS. 6C to 6K illustrate exemplary selections that can be made by a user for function value check 643 (FIG. 6C), user-supplied derivatives 644 (FIG. 6D), algorithm settings 645 (FIG. 6E), approximated derivatives 646 (FIG. 6F), multiobjective problem settings 647 (FIG. 6G), inner iteration stopping criteria 648 (FIG. 6H), plot functions 649 (FIG. 6I), output function 650 (FIG. 6J), and display to command window 651 (FIG. 6K). In FIGS. 6C to 6K, active regions, or selections, may be in a dark font (e.g., black) whereas inactive regions, or selections, may be in a lighter font (e.g., gray) so that the user's attention is drawn to active regions, or selections. Other embodiments may use other identification mechanisms to identify active and/or inactive regions/selections.

Exemplary Reference Region

Figure 7:
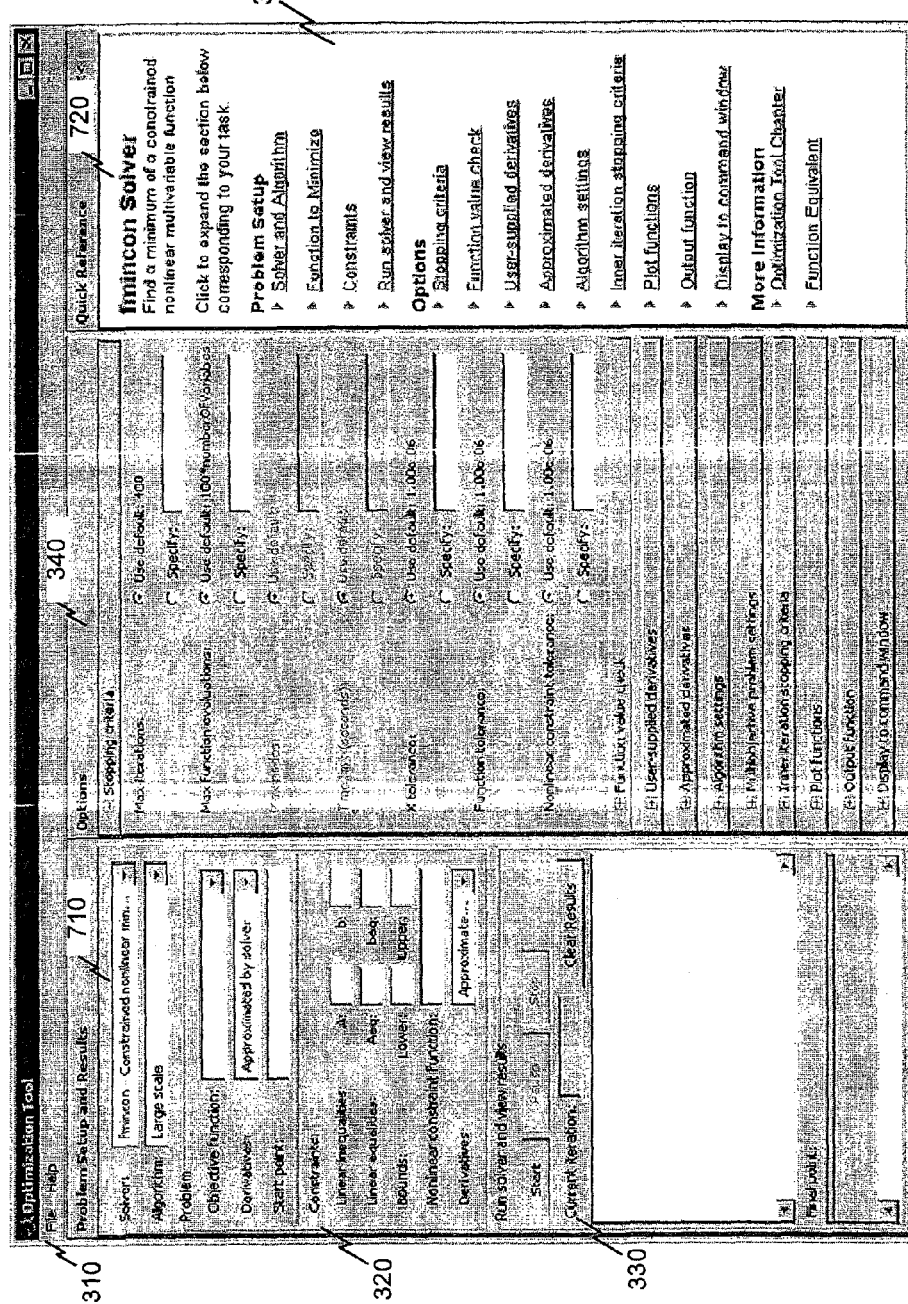
FIG. 7 illustrates an exemplary GUI that includes a reference region.

FIG. 7 illustrates an exemplary GUI 700 that includes a reference region 350. GUI 700 may include toolbar 310, setup region 320, results region 330, options region 340, reference region 350, selected solver 710 and selected solver help 720. Selected solver 710 may identify a solver (e.g., fmincon) that has been chosen for a particular problem. In one embodiment, selected solver 710 may be linked to reference region 350 and/or options region 340. For example, selected solver help 720 may display a heading for fmincon and may display other information related to fmincon. For example, information about problem setup, options and/or other types of information may be displayed to a user. Selected solver help 720 may change when a user selects a different solver in selected solver 710. In an exemplary embodiment, information displayed in options region 340 may also change based on a solver displayed in selected solver 710. Information in reference region 350 may be static or dynamic depending on particular implementations of the interactive optimizer. For example, a help index can be dynamically updated whenever new information is added, changed, deleted, etc., in the index.

Exemplary Distributed Implementation

Figure 8:
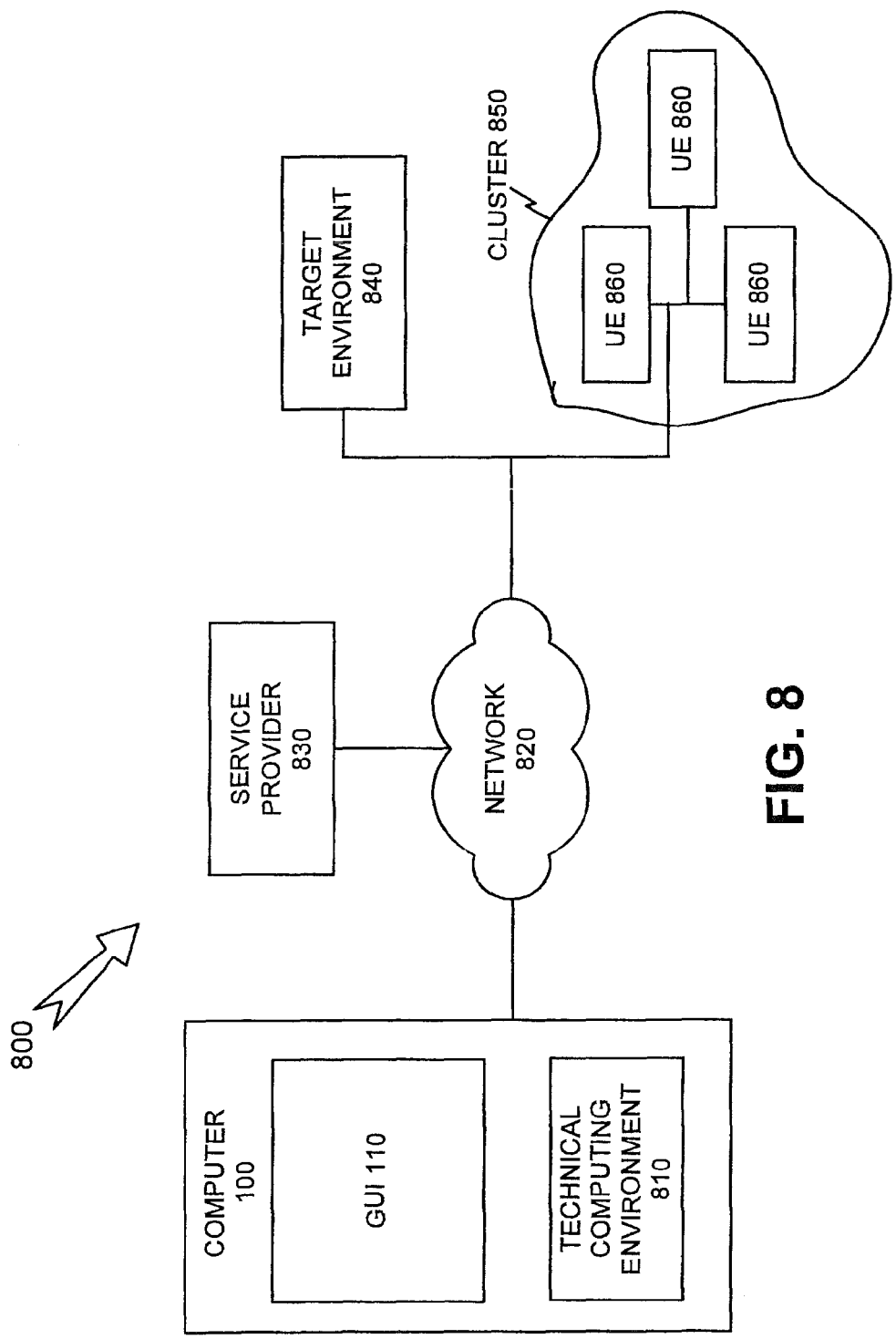
FIG. 8 illustrates an exemplary distributed implementation of an optimizer that includes a GUI.

FIG. 8 illustrates an exemplary distributed implementation of an optimizer that includes a GUI. System 800 may provide a distributed environment for performing optimization operations and can include computer 100, network 820, service provider 830, target environment 840, and cluster 850. The embodiment of FIG. 8 is exemplary, and other embodiments can include more devices, fewer devices, or devices in arrangements that differ from the arrangement of FIG. 8. Computer 100 may include GUI 110 and technical computing environment (TCE) 810.

TCE 810 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, TCE 810 may include a dynamically typed language that can be used to express problems and/or solutions in mathematical notations familiar to those of skill in the relevant arts. For example, TCE 810 may use an array as a basic element, where the array may not require dimensioning. In addition, TCE 810 may be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

TCE 810 may further provide mathematical functions and/or graphical tools (e.g., for creating plots, surfaces, images, volumetric representations, etc.). In one implementation, TCE 810 may provide these functions and/or tools using toolboxes (e.g., toolboxes for signal processing, image processing, data plotting, parallel processing, optimization, etc.). In another implementation, TCE 810 may provide these functions as block sets (e.g., an optimization block set). In still another implementation, TCE 810 may provide these functions in another way, such as via a library, etc. TCE 810 may be implemented as a text based environment, a graphically based environment, or another type of environment, such as a hybrid environment that is both text and graphically based.

Network 820 may include network devices, such as routers, switches, firewalls, and/or servers (not shown). Network 820 may be a hardwired network using wired conductors and/or optical fibers and/or may be a wireless network using free-space optical, radio frequency (RF), and/or acoustic transmission paths. In one implementation, network 820 may be a substantially open public network, such as the Internet. In another implementation, network 820 may be a more restricted network, such as a corporate virtual network. Implementations of networks and/or devices operating on networks described herein are not limited to any particular data type, protocol, architecture/configuration, etc.

Service provider 830 may include a device that makes a service available to another device. For example, service provider 830 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

Target environment 840 may include a device that receives information over network 820. For example, target environment 840 may be a device that receives optimization results from computer 100. In one embodiment, target device 840 may use optimization results to perform an operation, such as a display operation, a storage operation, a displacement operation (e.g., moving a robotic arm), etc.

Cluster 850 may include a number of units of execution (UEs) 860 and may perform processing on behalf of computer 100 and/or another device, such as service provider 830. For example, in one embodiment cluster 850 may perform parallel processing on an optimization problem received from computer 100 and/or TCE 810. Cluster 850 may include UEs 860 that reside on a single device or chip or that reside on a number of devices or chips.

UEs 860 may include processing devices that perform operations on behalf of a device, such as a requesting device. UEs 860 may be hardware based UEs or software based UEs. A "hardware UE," as the term is used herein, is to be broadly interpreted to include a device (e.g., a hardware resource) that performs and/or participates in remote (e.g., parallel) programming/processing activities. For example, a hardware UE may perform and/or participate in parallel programming activities in response to a request and/or a task it has received (e.g., received directly or via a proxy). A hardware UE may perform and/or participate in substantially any type of parallel programming (e.g., task, data, stream processing, etc.) using one or more devices. For example, in one implementation, a hardware UE may include a single processing device that includes multiple cores and in another implementation, the hardware UE may include a number of processors. For example, a first portion of an optimization may be performed in a first core and a second portion of the optimization may be performed in a second core, where the first and second core are associated with a single processor or are spread across multiple processors. A hardware UE may also be a programmable device, such as a field programmable gate array (FPGA), an application specific integrated circuit (ASIC), a digital signal processor (DSP), etc. Devices used in a hardware UE may be arranged in substantially any configuration (or topology), such as a grid, ring, star, etc. A hardware UE may support one or more threads (or processes) when performing processing operations.

A "software UE," as the term is used herein, is to be broadly interpreted to include a software resource (e.g., a technical computing environment [e.g., MATLAB software], a worker, a lab, etc.) that performs and/or participates in remote (e.g., parallel) programming/processing activities. For example, a software UE may perform and/or participate in parallel programming activities in response to a receipt of a program and/or one or more portions of the program. A software UE may perform and/or participate in substantially any type of parallel programming using one or more hardware UEs. Embodiments of a software UE may support one or more threads and/or processes when performing processing operations.

Embodiments of UE 860 may include code, such as code for TCE 810. For example, a UE may run a portion of TCE 810 that pertains to parallel processing activities. In one embodiment, service provider 830 may operate cluster 850 and may provide interactive optimization capabilities to computer 100 on a subscription basis (e.g., via a web service). Computer 100 may be able to perform optimization operations using GUI 110 when computer 100 maintains a subscription to the service.

Exemplary Processing

Figure 9A:
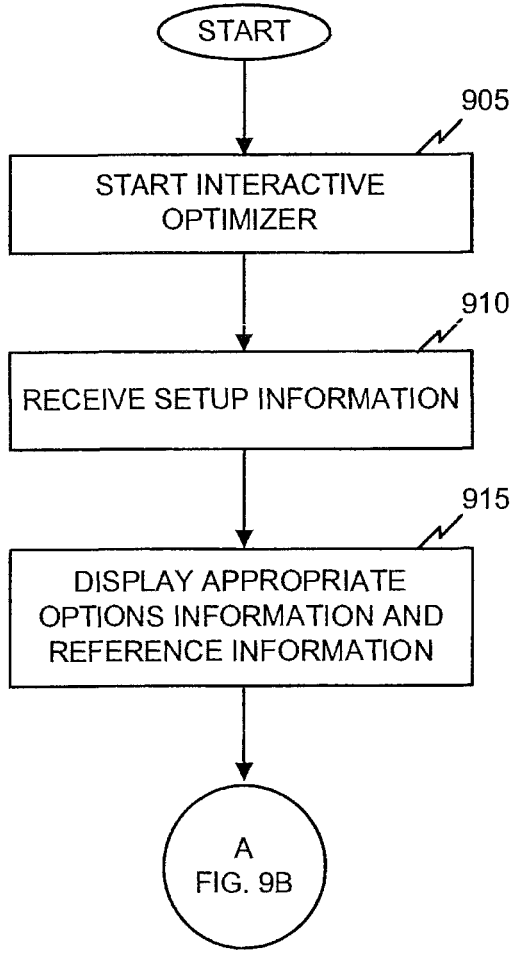
FIGS. 9A-C illustrate exemplary processing that can be performed using an interactive optimizer.
Figure 9B:
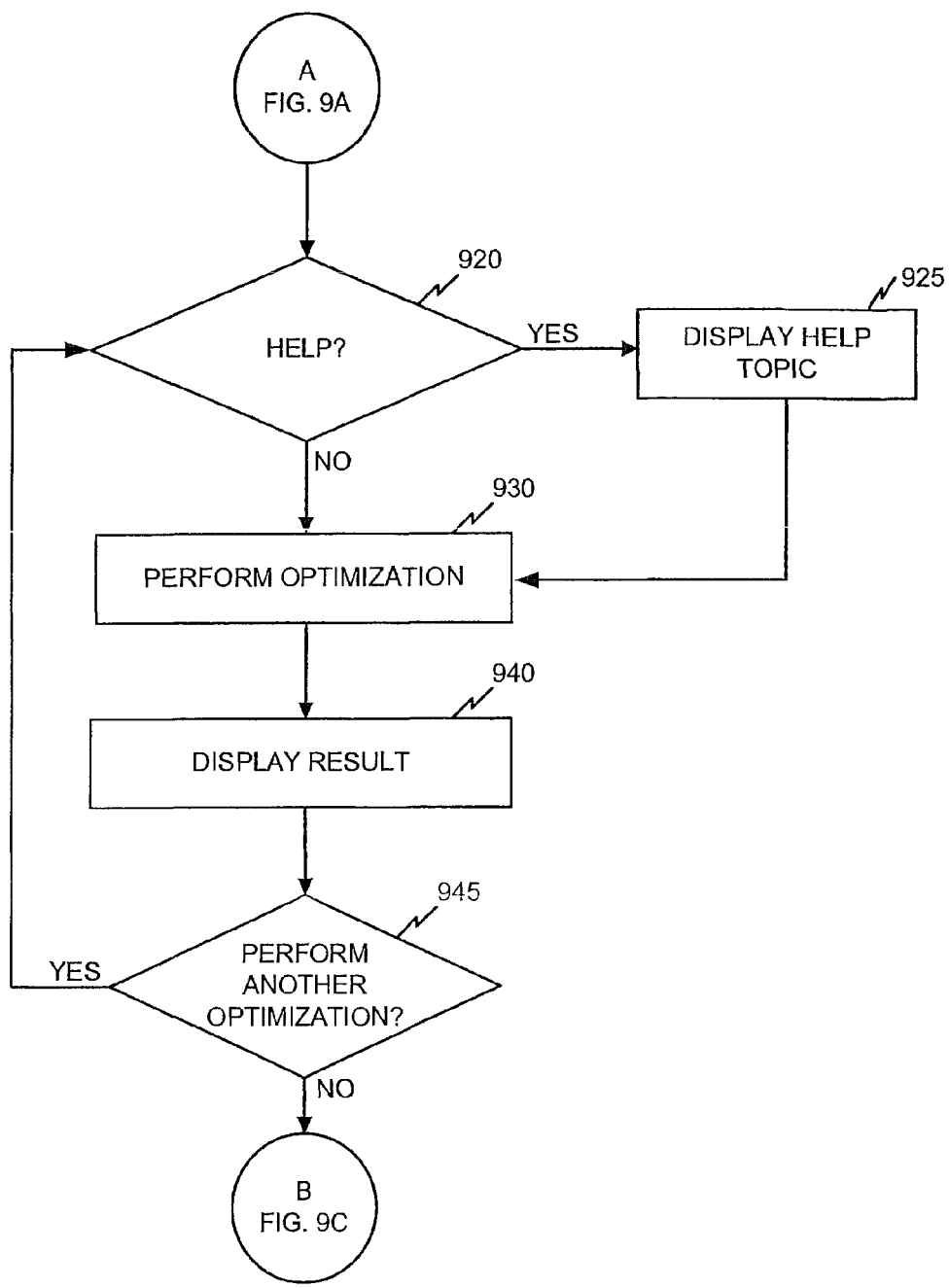
Figure 9C:
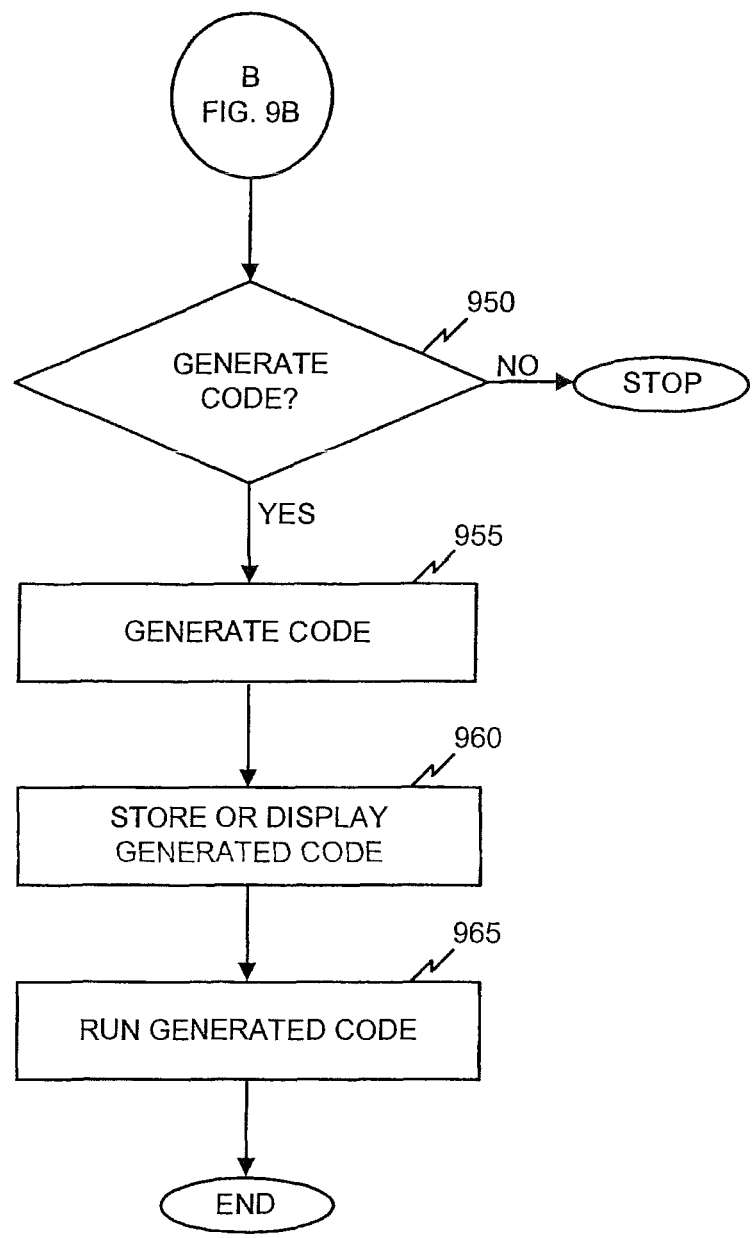

FIGS. 9A-9C illustrates exemplary processing that can be performed using an interactive optimizer. A user may start an interactive optimizer by, for example, double clicking on an icon or link associated with the optimizer (act 905). GUI 300 may be displayed to a user when the optimizer is operating. Solver 120 may receive setup information via input logic 220 and setup region 320 (act 910). For example, a user may select a solver via solver selector 401 and an algorithm via algorithm selector 402. Solver 120 may display options and reference information that are relevant to setup region 320 via options region 340 and reference region 350, respectively (act 915).

By way of example, a user may select a first solver and options region 340 may display a first set of active options that can be used with the selected solver. In addition, reference region 350 may list a first list of reference topics that are relevant to active options and to the selected solver. The user may then select another solver and options region 340 and reference region 350 may dynamically update to display different content based on the new user selection. In some implementations, options may be disjoint between a first solver and a second solver, where disjoint refers to options that do not overlap between the two solvers. In other implementations, options may partially overlap between the first solver and the second solver, where partially overlapping options share some, but not all, options. Embodiments of solver 120 may maintain explicit or implicit relationships between information displayed in setup region 320 and information displayed in options region 340 and/or reference region 350.

Referring now to FIG. 9B, computer 100 may determine whether the user has indicated that he/she needs help (act 920). For example, a user may be unsure as to how to select a particular option associated with a selected solver. The user may select a help topic in reference region 350 using a mouse. When a user selection for a help topic is detected at act 920, appropriate information for the help topic is displayed to the user (act 925). In one embodiment, help information can be retrieved from local storage on computer 100 and in another embodiment, help information can be retrieved from a remote location using a link, pointer, file name, etc. Processing may go to act 930 once the help topic is displayed.

When no user request for help is detected at act 920, an optimization may be performed (act 930). For example, the user may have specified a problem in problem area 403 and an optimization may be performed on that problem using a selected solver. A result for the optimization may be displayed to the user via a display device when the optimization is complete (act 940). For example, a result can be displayed as a graph, text, etc., in results region 330.

Computer 100 may determine whether another optimization should be performed (act 945). For example, a user may plan to run a number of solvers against a problem, a single solver against a number of problem formulations, etc., to determine which solver produces a satisfactory answer. The user may choose to perform another optimization using a new solver (or may alter options associated with a selected solver) in act 945. When the user wishes to perform another optimization, processing returns to act 920. In contrast, when the user does not wish to perform another optimization in act 945, processing advances to act 950 (FIG. 9C).

Referring now to FIG. 9C, computer 100 may determine whether code should be generated for solver 120, problem 130, etc. (act 950). When a user indicates that code should not be generated, processing may stop. In contrast, when a user indicates that code should be generated, code is generated at act 955. Exemplary embodiments may generate code in substantially any language, such as C, C++, Perl, assembly language, M (a language used by MATLAB), etc., using code generator 170.

Computer 100 may store the generated code in a storage device or may display the generated code to the user via a display device (act 960). In one embodiment, generated code may be stored for use at a later time, for display to a display device, for transmission to a destination device, etc. Generated code may be run on computer 100 and/or on another device to perform an operation, such as another optimization (act 965).

Exemplary Alternative Embodiments

A first alternative embodiment may enable a user to override system defaults displayed in regions of GUI 300. For example, computer 100 may populate GUI 300 with items that computer 100 determines are acceptable selections for a given solver. A user of computer 100 may determine that one or more of the populated items are unacceptable. The user may replace the one or more items with new selections determined by the user.

A second alternative embodiment may use an interactive optimizer for educational purposes. For example, a professor may be teaching a mathematics course where optimizations are to be studied as part of the curriculum. The professor may create a number of objective functions and/or solutions and may make them available to the students. The students may be required to run a number of solvers against a particular objective function using a number of different parameters, such as constraints, start point, lower bounds, upper bounds, etc., to determine which solver and set of parameters produces a best solution. The students may compare their results to the solutions prepared by the professor.

A third alternative embodiment may employ guidelines with an interactive optimizer. For example, a corporation may determine that certain solvers and parameter sets are preferred for solving optimization problems typically encountered in the industry in which the corporation operates. GUI 300 may be configured to display only the preferred solvers and parameters to a user as default solvers and/or parameters. The user may select from the default solvers and/or parameters when working on optimization problems at the corporation. The corporation may further employ guidelines, such as style guidelines, with code that may be generated by the interactive optimizer, such as code generated when the user is satisfied with a particular solver and/or set of parameters for a given problem. Generated code and/or other types of outputs (e.g., plots, reports, files, etc.) may be produced in accordance with the guidelines.

In a fourth alternative embodiment, the interactive optimizer may generate a first piece of code to call a selected solver or to generate code for the selected solver itself, and the interactive optimizer may generate a second piece of code for options that are used with the solver. For example, a user may interact with setup region 320 and options region 340 when working on an optimization problem. The user may identify a best solution to the problem and may wish to generate code for use on other similar problems. The user may further wish to have the options captured in a separate code file so that the user can use the options with another solver.

In a fifth alternative embodiment, the interactive optimizer can operate with function handles or other techniques that can be used to interact with functions. For example, a user may be interacting with GUI 300 and may prefer to enter a value that identifies a function, such as the objective function. Computer 100 may retrieve the identified objective function using the identifier (or handle) and may input the objective function into GUI 300 for processing based on other information, such as options, in GUI 300. Other information in GUI 300 may also be identified using function handles and/or other identifiers without departing from the spirit of the invention.

In a sixth alternative embodiment, an interactive optimizer may operate with a number of units of execution. For example, a user may operate on an objective function by choosing a solver. Solver 120 may determine that ten units of execution are available and may run the solver selected by the user on a first UE and may run nine other solvers on the remaining UEs. Solver 120 may determine which solver produces the best result based on options used with the solvers (e.g., user selected options with the first solver and system selected options with the other nine solvers). GUI 300 may provide the user with a rating, or score, for each solver based on the answer produced by respective solvers. The user may select the solver that produces the best answer. Embodiments of interactive optimizers that operate with multiple processors may allow parallel and/or distributed processing techniques to be applied to optimization problems to reduce processing times.

A seventh alternative embodiment may implement TCE 810 using one or more text-based products. For example, a text-based TCE 810, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

An eighth alternative embodiment may implement TCE 810 in a graphically-based TCE using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

A ninth alternative embodiment may be implemented in a language that is compatible with a product that includes a TCE, such as one or more of the above identified text-based or graphically-based TCE's. For example, MATLAB (a text-based TCE) may use a first command to represent an array of data and a second command to transpose the array. Another product, that may or may not include a TCE, may be MATLAB-compatible and may be able to use the array command, the array transpose command, or other MATLAB commands. For example, the other product may use the MATLAB commands to perform optimizations on one or more units of execution.

A tenth alternative embodiment may be implemented in a hybrid TCE that combines features of a text-based and graphically-based TCE. In one implementation, one TCE may operate on top of the other TCE. For example, a text-based TCE (e.g., MATLAB) may operate as a foundation and a graphically-based TCE (e.g., Simulink) may operate on top of MATLAB and may take advantage of text-based features (e.g., commands) to provide a user with a graphical user interface and graphical outputs (e.g., graphical displays for data, dashboards, etc.).

An eleventh alternative embodiment may allow information to be exported from GUI 300 to a destination, such as a sharable workspace that can be used by TCE 810 and/or another application or device. For example, a user may select a solver and may enter information about options relevant to the selected solver. The user may enter a selection that exports information in setup region 320, options region 340 and/or other regions of GUI 300 to the workspace, where information in the workspace can be used by other applications or devices. For example, TCE 810 may read information from the workspace and may perform additional processing on the information. TCE 810 may further generate a result that can be stored, displayed, or used by still another application or device to perform other operations.

Still other alternative implementations are possible consistent with the spirit of the invention.

Embodiments described herein produce useful and tangible results. For example, tangible results (e.g., results that can be perceived by a human) can be produced when a result is displayed to a user, when a device makes a sound, vibrates, performs an operation (e.g., moves, interacts with a person, etc.), etc. Useful results may include, but are not limited to, storage operations, transmission operations (e.g., sending information or receiving information), display operations, displacement operations, etc. Tangible and/or useful results may include still other activities, operations, etc., without departing from the spirit of the invention.

CONCLUSION

Implementations may provide devices and techniques that perform optimization operations based on user interactions with an optimizer, such as a graphically based optimizer.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 9A-9C, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1, 2, and 8 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A non-transitory computer-readable medium storing computer executable instructions, the instructions comprising:
one or more instructions that, when executed, cause a computing device to:
display a plurality of solvers in a first region of a graphical interface on a display device;
receive a first selection of a first selected solver,
the first selected solver being selected from among the plurality of solvers in the first region of the graphical interface, and
the first selected solver being associated with a first configuration of one or more active options;
display the first configuration of one or more active options in a second region of the graphical interface;
display reference information based on the first selected solver or based on the displayed first configuration of one or more active options;
receive a second selection of a second selected solver from among the plurality of solvers,
the second selection being received in the first region of the graphical interface,
the second selected solver being associated with a second configuration of one or more active options, and
the second configuration of one or more active options being different from the first configuration of one or more active options;
dynamically update the second region on the graphical interface to display the second configuration of one or more active options, the dynamically updating based on receiving the second selection of the second selected solver;
dynamically update the reference information based on the second selection of the second selected solver;
run the first selected solver or the second selected solver against a problem to produce a result; and
display the result on the display device or store the result in a memory.

2. The medium of claim 1, wherein the plurality of solvers comprise at least one of a solver for solving a binary integer programming problem, a solver for solving a linear programming problem, a solver for solving a quadratic programming problem, and a solver for solving a multiobjective goal attainment optimization problem.

3. The medium of claim 1, wherein the plurality of solvers comprise at least one of a solver for finding a minimum of a single-variable function on a fixed interval, a solver for finding a minimum of a constrained nonlinear multivariable function, a solver for finding a minimum of the worst-case value of a set of multivariable functions, a solver for finding a minimum of an unconstrained nonlinear multivariable functions using a derivative-free method, a solver for finding a minimum of an unconstrained nonlinear multivariable function, and a solver for finding a minimum of a semi-infinitely constrained nonlinear multivariable function.

4. The medium of claim 1, wherein the plurality of solvers comprise at least one of a solver for solving a system of nonlinear equations and a solver for finding a root of a nonlinear equation.

5. The medium of claim 1, wherein the plurality of solvers comprise at least one of a solver for solving a nonlinear curve fitting problem in the least-squares sense, a solver for solving a constrained linear least-squares problem, a solver for solving a nonlinear least-squares problem, and a solver for finding a minimum of a nonnegative least-squares problem.

6. The medium of claim 1, wherein the plurality of solvers comprise at least one of a solver for finding a minimum of a constrained nonlinear multivariable function using a genetic algorithm, a solver for finding a minimum of an unconstrained nonlinear multivariable function using a genetic algorithm, and a solver for solving a multiobjective nonlinear multivariable function using a genetic algorithm.

7. The medium of claim 1, wherein the plurality of solvers comprise at least one of a solver for finding a minimum of a constrained nonlinear multivariable function using derivative-free method, a solver for finding a minimum of an unconstrained nonlinear multivariable function using derivative-free method, a solver for finding a global minimum of a constrained nonlinear multivariable function, a solver for finding a global minimum of an unconstrained nonlinear multivariable function, a solver for finding multiple minima and the global minima of a constrained nonlinear multivariable function, and a solver for finding multiple minima and the global minima of an unconstrained nonlinear multivariable function.

8. The medium of claim 1, wherein the selection of the first solver is a default selection.

9. A computing device, comprising:
a non-transitory storage medium storing instructions; and
a processor programmed to execute the instructions, the instructions when executed causing the processor to:
provide a graphical user interface, the graphical user interface displaying:
a first region comprising a plurality of solvers, and
a second region comprising information about the plurality of solvers,
receive a selection of a selected solver from among the plurality of solvers in the first region of the graphical user interface;
display options, where the options are:
related to the selected solver,
displayed in the second region of the graphical user interface, and
displayed based on the selection of the selected solver;
display reference information relating to the selected solver,
wherein the options are dynamically updated based on selections in the first region of the graphical user interface or the second region of the graphical user interface to display a configuration of active options that is dependent on the solver selected in the first region;
run the selected solver against a problem to produce a result; and
display the result on the graphical user interface.

10. The device of claim 9, wherein the plurality of solvers comprise at least one of a solver for solving a binary integer programming problem, a solver for solving a linear programming problem, a solver for solving a quadratic programming problem, and a solver for solving a multiobjective goal attainment optimization problem.

11. The device of claim 9, wherein the plurality of solvers comprise at least one of a solver for finding a minimum of a single-variable function on a fixed interval, a solver for finding a minimum of a constrained nonlinear multivariable function, a solver for finding a minimum of the worst-case value of a set of multivariable functions, a solver for finding a minimum of an unconstrained nonlinear multivariable functions using a derivative-free method, a solver for finding a minimum of an unconstrained nonlinear multivariable function, and a solver for finding a minimum of a semi-infinitely constrained nonlinear multivariable function.

12. The device of claim 9, wherein the plurality of solvers comprise at least one of a solver for solving a system of nonlinear equations and a solver for finding a root of a nonlinear equation.

13. The device of claim 9, wherein the plurality of solvers comprise at least one of a solver for solving a nonlinear curve fitting problem in the least-squares sense, a solver for solving a constrained linear least-squares problem, a solver for solving a nonlinear least-squares problem, and a solver for finding a minimum of a nonnegative least-squares problem.

14. The device of claim 9, wherein the plurality of solvers comprise at least one of a solver for finding a minimum of a constrained nonlinear multivariable function using a genetic algorithm, a solver for finding a minimum of an unconstrained nonlinear multivariable function using a genetic algorithm, and a solver for solving a multiobjective nonlinear multivariable function using a genetic algorithm.

15. The device of claim 9, wherein the plurality of solvers comprise at least one of a solver for finding a minimum of a constrained nonlinear multivariable function using derivative-free method, a solver for finding a minimum of an unconstrained nonlinear multivariable function using derivative-free method, a solver for finding a global minimum of a constrained nonlinear multivariable function, a solver for finding a global minimum of an unconstrained nonlinear multivariable function, a solver for finding multiple minima and the global minima of a constrained nonlinear multivariable function, and a solver for finding multiple minima and the global minima of an unconstrained nonlinear multivariable function.

16. The device of claim 9, wherein the selection of the selected solver is a selection of a default solver.

17. A computer-implemented method comprising:
displaying a plurality of solvers in a first region of a graphical interface on a display device;
receiving a first selection of a first selected solver from among the plurality of solvers in the first region of the graphical interface, the first selected solver being associated with a first configuration of one or more active options;
displaying the first configuration of one or more active options in a second region of the graphical interface;
displaying reference information based on the first selected solver or based on the first configuration of one or more active options
receiving a second selection of a second selected solver from among the plurality of solvers, the second selection being received in the first region of the graphical interface, the second selected solver being associated with a second configuration of one or more active options that is different from the first configuration of one or more active options;
dynamically update the second region on the graphical interface to display the second configuration of one or more active options upon receiving the second selection of the second selected solver;
updating the reference information based on the second selection of the second selected solver;
running the first selected solver or the second selected solver against a problem to produce a result; and
displaying the result on the display device or storing the result in a memory.

18. The method of claim 17, wherein the plurality of solvers comprise at least one of a solver for solving a binary integer programming problem, a solver for solving a linear programming problem, a solver for solving a quadratic programming problem, and a solver for solving a multiobjective goal attainment optimization problem.

19. The method of claim 17, wherein the plurality of solvers comprise at least one of a solver for finding a minimum of a single-variable function on a fixed interval, a solver for finding a minimum of a constrained nonlinear multivariable function, a solver for finding a minimum of the worst-case value of a set of multivariable functions, a solver for finding a minimum of an unconstrained nonlinear multivariable functions using a derivative-free method, a solver for finding a minimum of an unconstrained nonlinear multivariable function, and a solver for finding a minimum of a semi-infinitely constrained nonlinear multivariable function.

20. The method of claim 17, wherein the plurality of solvers comprise at least one of a solver for solving a system of nonlinear equations and a solver for finding a root of a nonlinear equation.

21. The method of claim 17, wherein the plurality of solvers comprise at least one of a solver for solving a nonlinear curve fitting problem in the least-squares sense, a solver for solving a constrained linear least-squares problem, a solver for solving a nonlinear least-squares problem, and a solver for finding a minimum of a nonnegative least-squares problem.

22. The method of claim 17, wherein the plurality of solvers comprise at least one of a solver for finding a minimum of a constrained nonlinear multivariable function using a genetic algorithm, a solver for finding a minimum of an unconstrained nonlinear multivariable function using a genetic algorithm, and a solver for solving a multiobjective nonlinear multivariable function using a genetic algorithm.

23. The method of claim 17, wherein the plurality of solvers comprise at least one of a solver for finding a minimum of a constrained nonlinear multivariable function using derivative-free method, a solver for finding a minimum of an unconstrained nonlinear multivariable function using derivative-free method, a solver for finding a global minimum of a constrained nonlinear multivariable function, a solver for finding a global minimum of an unconstrained nonlinear multivariable function, a solver for finding multiple minima and the global minima of a constrained nonlinear multivariable function, and a solver for finding multiple minima and the global minima of an unconstrained nonlinear multivariable function.

* * * * *